(12) United States Patent
Ouchida et al.

(10) Patent No.: US 9,309,952 B2
(45) Date of Patent: Apr. 12, 2016

(54) BELT-TYPE CONTINUOUSLY VARIABLE TRANSMISSION

(75) Inventors: Takeshi Ouchida, Osaka (JP); Fumitoshi Ishino, Osaka (JP)

(73) Assignee: YANMAR CO., LTD. (JP)

( * ) Notice: Subject to any disclaimer, the term of this patent is extended or adjusted under 35 U.S.C. 154(b) by 296 days.

(21) Appl. No.: 14/126,272

(22) PCT Filed: Feb. 29, 2012

(86) PCT No.: PCT/JP2012/055130
§ 371 (c)(1),
(2), (4) Date: Dec. 13, 2013

(87) PCT Pub. No.: WO2012/172836
PCT Pub. Date: Dec. 20, 2012

(65) Prior Publication Data
US 2014/0128188 A1  May 8, 2014

(30) Foreign Application Priority Data

Jun. 15, 2011  (JP) .................................. 2011-133554
Jun. 23, 2011  (JP) .................................. 2011-139948

(51) Int. Cl.
*F16H 9/12* (2006.01)
*F16H 61/00* (2006.01)
(Continued)

(52) U.S. Cl.
CPC ................ *F16H 9/125* (2013.01); *F16H 61/00* (2013.01); *F16H 61/66263* (2013.01); *F16H 55/56* (2013.01); *F16H 63/065* (2013.01); *F16H 2061/1264* (2013.01)

(58) Field of Classification Search
CPC ......... F16H 9/125; F16H 61/00; F16H 55/56; F16H 61/66263; F16H 63/065; F16H 2061/1264

USPC ....................... 474/8–29; 137/596.14, 596.17
See application file for complete search history.

(56) References Cited

U.S. PATENT DOCUMENTS 4,545,407 A * 10/1985 Dudash ......................... 137/596
4,597,308 A    7/1986 Tanaka
(Continued)

FOREIGN PATENT DOCUMENTS

JP    S5026430 U    3/1975
JP    58-180863 A   10/1983
(Continued)

OTHER PUBLICATIONS

Chinese First Office Action corresponding to Application No. 201280036257.1; Date of Mailing: Feb. 28, 2015, with English translation.

(Continued)

*Primary Examiner* — William E Dondero
*Assistant Examiner* — Robert T Reese
(74) *Attorney, Agent, or Firm* — Cantor Colburn LLP

(57) ABSTRACT

Provided is a belt-type continuously variable transmission which may prevent a servo spool from sliding even when a movable sieve slides due to reduced pressure in a hydraulic cylinder. A hydraulic servo mechanism comprises a servo spool and a feedback spool, and contiguous members coming into contact with the feedback spool (84) between a hydraulic cylinder and the feedback spool The present invention also comprises a spool position maintaining unit that makes it possible for the contiguous members to slide in relation to a movable side cylinder case when pressure in the hydraulic cylinder is lower than a predetermined value.

4 Claims, 21 Drawing Sheets

(51) Int. Cl.
*F16H 61/662* (2006.01)
*F16H 61/12* (2010.01)
*F16H 63/06* (2006.01)
*F16H 55/56* (2006.01)

(56) References Cited

U.S. PATENT DOCUMENTS

| | | | | |
|---|---|---|---|---|
| 9,194,465 | B2* | 11/2015 | Lundberg | |
| 2005/0250606 | A1* | 11/2005 | Shioiri et al. | 474/18 |
| 2006/0058128 | A1* | 3/2006 | Glas | 474/8 |
| 2008/0176706 | A1* | 7/2008 | Wu et al. | 477/5 |
| 2010/0099525 | A1 | 4/2010 | Tsukuda | |
| 2014/0011616 | A1* | 1/2014 | Ijichi et al. | 474/28 |

FOREIGN PATENT DOCUMENTS

| | | |
|---|---|---|
| JP | S6023356 U | 2/1985 |
| JP | 64087962 A | 4/1989 |
| JP | 5-280633 A | 10/1993 |
| JP | H08303542 A | 11/1996 |
| JP | 11304025 A | 11/1999 |
| JP | 2005-265007 A | 9/2005 |
| JP | 2010-96338 A | 4/2010 |

OTHER PUBLICATIONS

Japanese Notice of Reasons for Refusal corresponding to Application No. 2011-139948; Shipping Date: Sep. 16, 2014, with English translation.

* cited by examiner (a)

(b)

BELT-TYPE CONTINUOUSLY VARIABLE TRANSMISSION

CROSS REFERENCE TO RELATED APPLICATIONS

This is the U.S. national stage of application No. PCT/JP2012/055130, filed on 29 Feb. 2012. Priority under 35 U.S.C. §119(a) and 35 U.S.C. §365(b) is claimed from Japanese Application Nos. 2011-133554 and 2011-139948, filed 15 Jun. 2011 and 23 Jun. 2011, respectively, the disclosures of both of which are also incorporated herein by reference.

TECHNICAL FIELD

The present invention relates to a technique of a belt-type continuously variable transmission, and more particularly relates to a technique of a belt-type continuously variable transmission in which a movable sheave is provided with a hydraulic cylinder, and the feeding of hydraulic oil to the hydraulic cylinder is controlled by a hydraulic servo mechanism.

BACKGROUND ART

A technique described in Patent Literature 1 has been known as a conventional technique of a belt-type continuously variable transmission in which a driving force is transmitted with a belt being wound across a pair of pulleys having a variable groove width.

In the belt-type continuously variable transmission described in Patent Literature 1, a movable sheave is provided with a hydraulic cylinder. The belt-type continuously variable transmission electrically controls an operation of the hydraulic cylinder for changing the groove width (the position of the movable sheave) of the pulley on the basis of signals from various sensors such as a vehicle speed sensor and an accelerator pedal position sensor so that the transmission ratio in the belt-type continuously variable transmission is changed as desired.

The belt-type continuously variable transmission described in Patent Literature 1 has a disadvantage that a complicated configuration is required for electrically controlling the hydraulic cylinder. Accordingly, there exists a technique for controlling the operation of the hydraulic cylinder while detecting (feedback) the slid position of the movable sheave by using a mechanical hydraulic servo mechanism including a servo spool, a feedback spool, etc.

However, with such a conventional technique, when the pressure in the hydraulic cylinder drops because a driving source such as an engine stops or due to other reasons, the movable sheave might slide by the tensile force of the belt, and the servo spool might slide along with the sliding of the movable sheave. That is to say, when the driving source stops, the servo spool might slide against an operator's will. Accordingly, it is disadvantageous because the operator might have a sense of incongruity.

PRIOR ART DOCUMENTS

Patent Literature

Patent Literature 1: the Japanese Patent Laid Open Gazette 2010-96338

SUMMARY OF THE INVENTION

Problems to be Solved by the Invention

The present invention is made in view of the above circumstance.

An object of the invention is to provide a belt-type continuously variable transmission in which a servo spool can be prevented from sliding even if the pressure in a hydraulic cylinder drops and a movable sheave slides.

Means for Solving the Problems

The problems to be solved by the present invention have been described above. Now, means for solving the problems will be described.

That is to say, as for claim 1, a belt-type continuously variable transmission in which a movable sheave is provided with a hydraulic cylinder, which controls the feeding of hydraulic oil to the hydraulic cylinder by means of a hydraulic servo mechanism is provided. The hydraulic servo mechanism includes: a servo spool which is biased so as to return to a neutral position and is coupled to a speed-change controller, the servo spool switches an oil passage to the hydraulic cylinder according to the operation of the speed-change controller; and a feedback spool enclosed slidably with respect to the servo spool and arranged so as to slide following a movable side cylinder casing constituting the hydraulic cylinder, the feedback spool switches the oil passage in such a manner that the sliding position of the movable sheave is retained at a position corresponding to the sliding position of the servo spool; and includes: a contact member coming into contact with the feedback spool between the hydraulic cylinder and the feedback spool; and includes: a spool position maintaining mechanism that makes it possible for the contact member to slide in relation to the movable side cylinder casing when pressure in the hydraulic cylinder is lower than a predetermined value.

As for claim 2, the spool position maintaining mechanism includes: a communication hole formed in the movable side cylinder casing for communicating the inside and the outside of the hydraulic cylinder, the communication hole includes a part whose longitudinal direction is a sliding direction of the movable side cylinder casing; a sliding member inserted slidably into the communication hole, wherein an end portion of the sliding member projecting the outside of the hydraulic cylinder is arranged so as to come into contact with a surface of the contact member opposite to the surface abutting on the feedback spool; and a inhibiting member for regulating the sliding of the contact member toward the feedback spool side at a predetermined position.

As for claim 3, the belt-type continuously variable transmission further includes an interlocking member for regulating sliding of the feedback spool in a direction to abut on the one of the movable sheave at a predetermined position.

As for claim 4, an oil groove constituting an oil passage to the hydraulic cylinder is formed in the interlocking member.

Effects of the Invention

The present invention exerts effects described below. That is to say, when the pressure in the hydraulic cylinder drops because a driving source stops or due to other reasons, the input side movable sheave might be slid by the tensile force of the belt, but the servo spool can be prevented from sliding along with the sliding of the input side movable sheave. Thus, the speed-change controller coupled to the servo spool can be prevented from moving. Furthermore, the servo spool is constantly biased to the neutral position. Thus, even when the pressure in the hydraulic cylinder drops as described above, the servo spool can be maintained at the neutral position, and thus the speed-change controller can be maintained at the neutral position.

DESCRIPTION OF EMBODIMENTS

Figure 1:
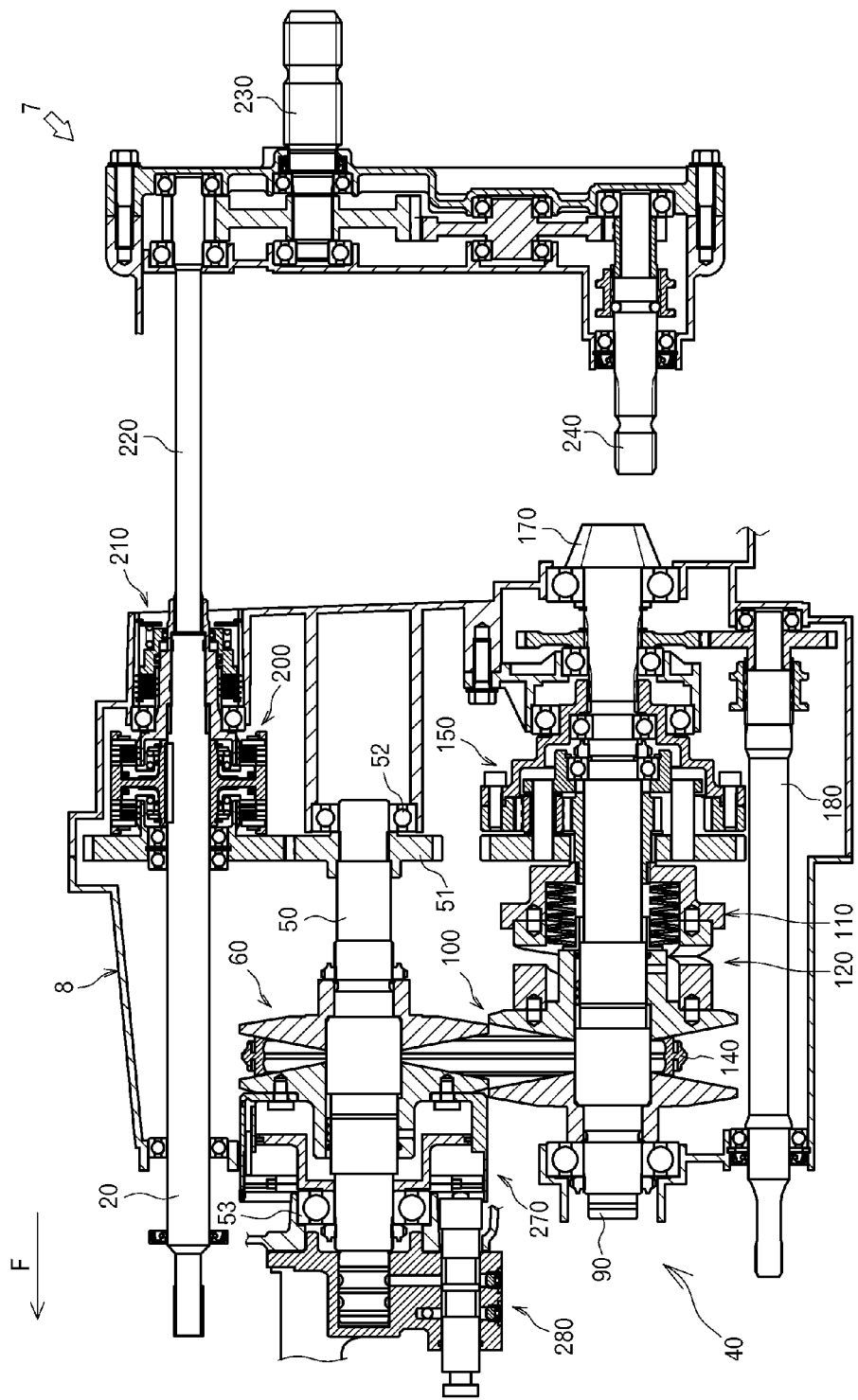
FIG. 1 It is a sideward cross-sectional view showing the overall structure of a transmission comprising a belt-type continuously variable transmission according to one embodiment of the present invention.

Hereinafter, an explanation will be given of a transmission 7 which is a transmission device of a working vehicle with reference to FIG. 1. The transmission 7 according to the present embodiment is provided in a tractor which is an agricultural vehicle. However, the present invention is not limited thereto and can be employed generally for vehicles such as another agricultural vehicle, construction vehicle, industrial vehicle etc. In below explanation, a direction of an arrow F in the drawing is defined as the front direction.

The transmission 7 changes power from an engine (not shown in Figures), being a drive source, in speed and then outputs it. The transmission 7 includes a mission input shaft 20, a clutch mechanism 200, a belt-type continuously variable transmission 40, an output shaft 170, a front wheel driving transmission shaft 180, a PTO brake 210, a PTO input shaft 220, a rear PTO shaft 230, a mid PTO shaft 240, etc.

The power from the engine is transmitted to the mission input shaft 20, and then transmitted to the belt-type continuously variable transmission 40 and the PTO input shaft 220 via the clutch mechanism 200. The power transmitted to the belt-type continuously variable transmission 40 is changed steplessly in speed at the belt-type continuously variable transmission 40, and then transmitted to the output shaft 170 and the front wheel driving transmission shaft 180. The power transmitted to the output shaft 170 is then transmitted to rear wheels (not shown in Figures) of the tractor via a final reduction mechanism (not shown in Figures) etc. The power transmitted to the front wheel driving transmission shaft 180 is then transmitted to front wheels (not shown in Figures) of the tractor via a front axle shaft (not shown in Figures). And the power transmitted to the PTO input shaft 220 is then transmitted to the rear PTO shaft 230 and the mid PTO shaft 240 via gears etc.

In the transmission 7 configured as above, vehicle speed of the tractor can be arbitrarily adjusted by changing transmission gear ratio of the belt-type continuously variable transmission 40. A working implement (for example, rotary tiller etc.) connected to the rear PTO shaft 230 and a working implement (for example, mid mower etc.) connected to the mid PTO shaft 240 can be driven by the power transmitted to the rear PTO shaft 230 and the mid PTO shaft 240. Furthermore, when the power transmission from the engine to the PTO input shaft 220 is cut off by the clutch mechanism 200, rotation of the PTO input shaft 220 is applied the PTO brake 210.

The belt-type continuously variable transmission 40 can be employed for transmissions other than the transmission 7 according to the present embodiment, and can be widely employed for transmission that changes the power from the drive force in speed and then outputs the power.

Hereinafter, a detailed explanation will be given of each part of the belt-type continuously variable transmission 40 with reference to FIGS. 1-15. The belt-type continuously variable transmission 40 includes a speed-change input shaft 50, an input pulley 60, a hydraulic cylinder 270, a hydraulic servo mechanism 280, a transmission shaft 90, an output pulley 100, an output member 110, a cam mechanism 120, an biasing member 130, a belt 140, a planetary gear mechanism 150, etc.

Figure 2:
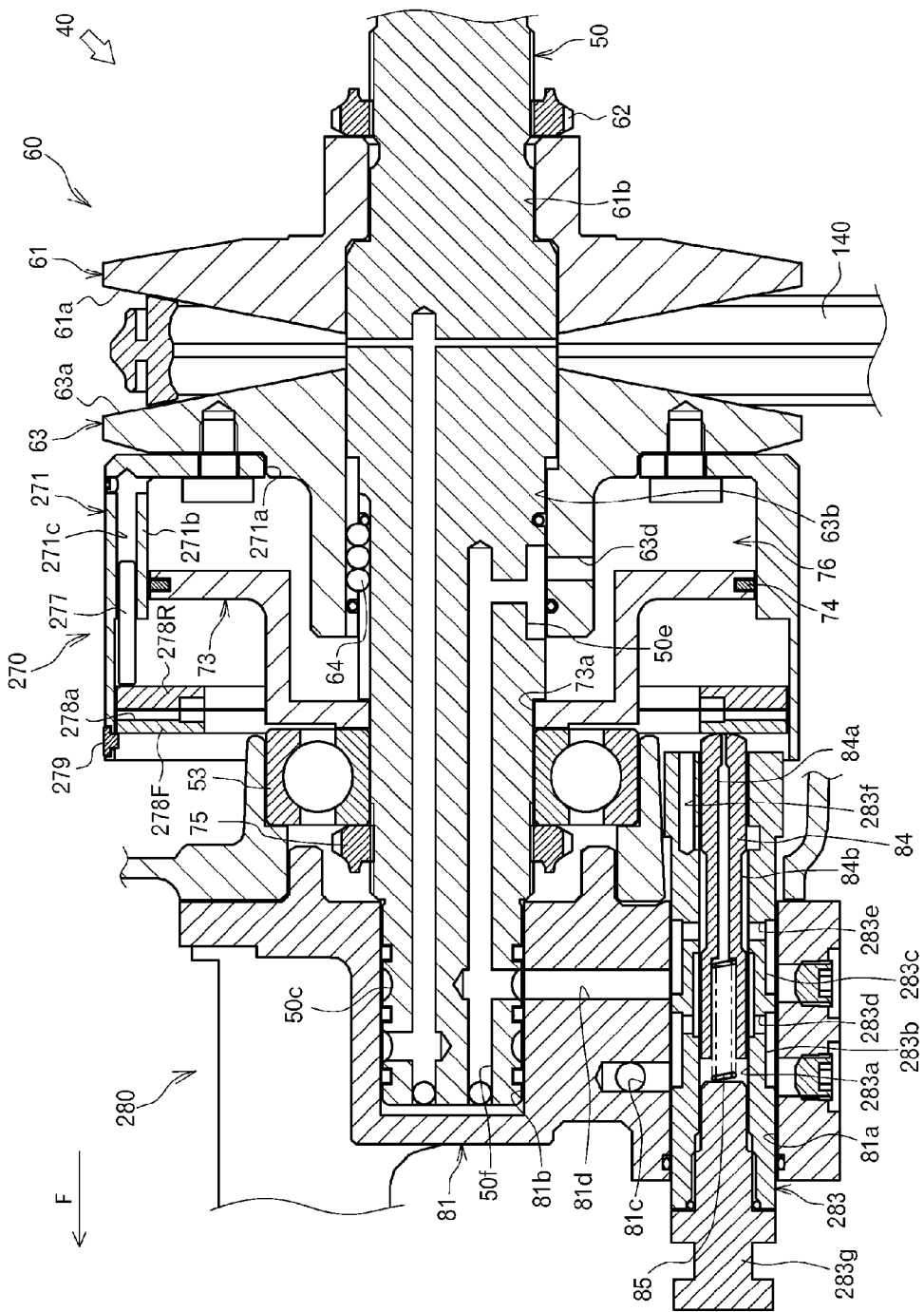
FIG. 2 It is a sideward cross-sectional view showing an input pulley, a hydraulic cylinder, a hydraulic servo mechanism, etc. of the belt-type continuously variable transmission.

The speed-change input shaft 50 illustrated in FIG. 1 and FIG. 2 is connected to the mission input shaft 20, and is provided for transmitting the power from the mission input shaft 20. The speed-change input shaft 50 is a substantially columnar shaped member, and is arranged so that the axis thereof is along the longitudinal direction. In the vicinity of the rear end of the speed-change input shaft 50, a speed-change input gear 51 is connected with the speed-change input shaft 50 in a manner to be relatively unable to rotate by spline-fitting. The speed-change input gear 51 is meshed with a gear of the clutch mechanism 200 (see FIG. 1) so that the power of the mission input shaft 20 can be transmitted via the clutch mechanism 200. However, the connection method of the speed-change input gear 51 to the speed-change input shaft 50 is not limited to the above mentioned spline-fitting. Alternatively, for example, the speed-change input gear 51 can be integrated with the speed-change input shaft 50. A bearing 52 is located immediately behind the speed-change input gear 51. The speed-change input shaft 50 is fit into the bearing 52. In the vicinity of the front end of the speed-change input shaft 50, the speed-change input shaft 50 is fit into a bearing 53. The bearing 52 and the bearing 53 is supported by a transmission case 8 storing the transmission 7. As such, the speed-change input shaft 50 is supported by the transmission case 8 in a manner to be able to turn.

The input pulley 60 illustrated in FIG. 2 is arranged on the speed-change input shaft 50. The input pulley 60 is a pulley which has a pair of sheaves. The input pulley 60 includes an input side fixed sheave 61, an input side movable sheave 63, etc.

The input side fixed sheave 61 is a member which has a shaft cylinder portion with an approximately cylindrical shape and a sheave portion with an annular shape. The sheave portion is integrally formed at the front end of the shaft cylinder portion, and has an approximately truncated cone shape in the sideward cross-sectional view. The sheave portion is arranged forward of the shaft cylinder portion, and the input side fixed sheave 61 is fitted on the speed-change input shaft 50. A front surface 61a of the sheave portion of the input side fixed sheave 61 is formed as a tilt surface whose diameter increases from the front toward the rear. And a through hole 61b is formed on the axis of the input side fixed sheave 61. The through hole 61b penetrates the input side fixed sheave 61 in a front-back direction. The speed-change input shaft 50 is inserted into the through hole 61b of the input side fixed sheave 61 from front. The speed-change input shaft 50 is press-fitted to the through hole 61b, whereby the input side fixed sheave 61 is fixed so as not to be rotatable relatively with respect to the speed-change input shaft 50 and not to be slidable.

In this embodiment, the speed-change input shaft 50 and the input side fixed sheave 61 are press fitted (fitted) with each other. However, alternatively, any fitting method utilizing the configuration that the speed-change input shaft 50 has a larger diameter than the through hole 61b of the input side fixed sheave 61, such as "shrink fitting" and "expansion fitting", may be used.

A locknut 62 is fastened to the speed-change input shaft 50 at a portion right behind the input side fixed sheave 61. Thus, the input side fixed sheave 61 can be prevented from sliding rearward on the speed-change input shaft 50, and the input side fixed sheave 61 can be surely fixed to the speed-change input shaft 50.

The input side movable sheave 63 is a member which has a shaft cylinder portion with an approximately cylindrical shape and a sheave portion with an annular shape. The sheave portion is integrally formed at the rear end of the shaft cylinder portion, and has an approximately truncated cone shape in the sideward cross-sectional view. The sheave portion is arranged rearward of the shaft cylinder portion, and the input side movable sheave 63 is fitted on the speed-change input shaft 50 at the position in front of the input side fixed sheave 61. A rear surface 63a of the sheave portion of the input side movable sheave 63 is formed as a tilt surface whose diameter increases from the rear toward the front. And a through hole 63b is formed on the axis of the input side movable sheave 63. The through hole 63b penetrates the input side movable sheave 63 in a front-back direction. The speed-change input shaft 50 is inserted into the through hole 63b of the input side movable sheave 63 from rear. The front surface 61a of the input side fixed sheave 61 and the rear surface 63a of the input side movable sheave 63 are facing each other on the speed-change input shaft 50. Thus, a groove of the input pulley 60 is defined by the front surface 61a and the rear surface 63a. And grooves are formed on an inner peripheral surface of the through hole 63b and an outer peripheral surface of the speed-change input shaft 50 along the axial direction of the speed-change input shaft 50. The grooves are formed at three portions in the inner peripheral surface of the through hole 63b and the outer peripheral surface of the speed-change input shaft 50 at an equal interval in the peripheral direction. Steel balls 64, 64, . . . are disposed in a pair of grooves facing each other. Thus, the input side movable sheave 63 is supported by the speed-change input shaft 50 in such a manner as to be slidable in the axial direction and not to be relatively rotatable. A through hole 63d communicating between the outer peripheral surface of the shaft cylinder portion and the inner surface of the through hole 63b is formed in the input side movable sheave 63.

The hydraulic cylinder 270 is formed on the input side movable sheave 63. The hydraulic cylinder 270 is provided for sliding the input side movable sheave 63 on the speed-change input shaft 50 along the axial direction of the speed-change input shaft 50. The hydraulic cylinder 270 includes a movable side cylinder casing 271, a fixed side cylinder casing 73, etc.

Figure 3:
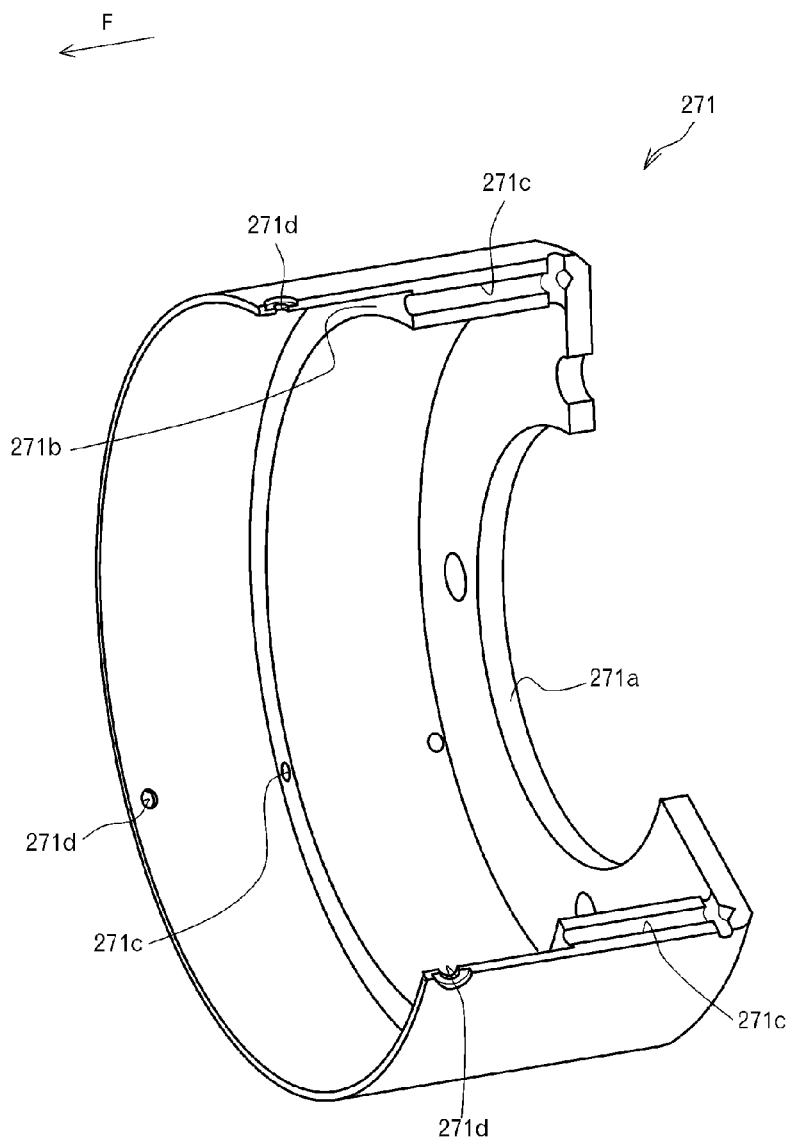
FIG. 3 It is a perspective view showing a movable side cylinder casing.
Figure 4:
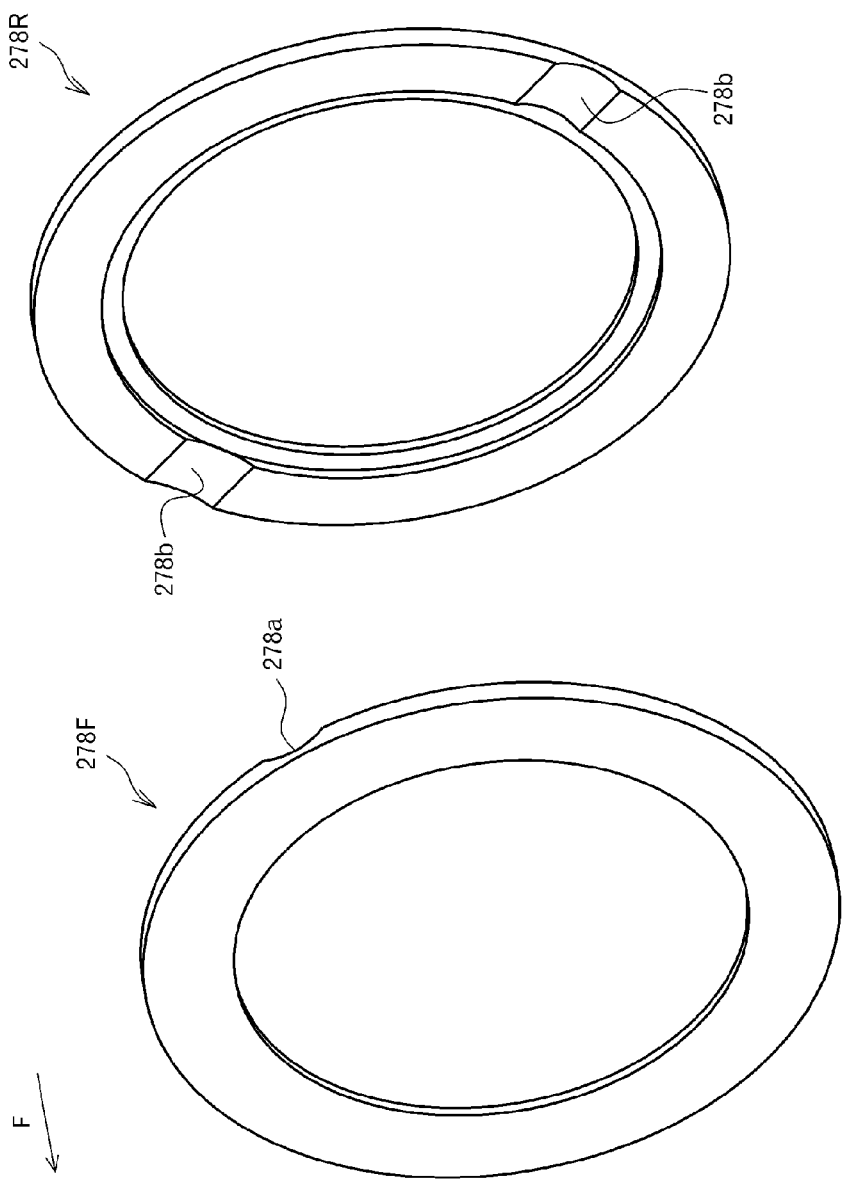
FIG. 4 It is a perspective view showing a contact member.

The movable side cylinder casing 271, illustrated in FIG. 2 and FIG. 3, is a cylindrical shaped member that has a bottom surface (rear surface). The front portion of the movable cylinder casing 271 is opened. At the center of the rear surface of the movable side cylinder casing 271, a through hole 271a is formed along the axial direction. The shaft cylinder portion of the input side movable sheave 63 is inserted into the through hole 271a.

A thick wall part 271b is formed from an approximately longitudinal center to an end portion of a cylinder portion of the movable side cylinder casing 271 in such a way that the thick wall part 271b has a thicker outer periphery surface than that of other parts (a front portion side) of the cylinder portion. The outer periphery surface of the cylinder portion of the movable side cylinder casing 271 is a uniform surface, whereas an inner periphery surface of the thick wall part 271b is protruded toward the inside of the movable side cylinder casing 271 compared to an inner periphery surface of other parts of the cylinder portion.

Communication holes 271c, 271c, . . . are formed in the thick wall part 271b of the movable side cylinder casing 271. The communication hole 271c includes a lateral hole formed in the front-rear direction from the front end surface (a portion positioned at an inner side of the movable side cylinder casing 271) to a portion around the rear surface of the movable side cylinder casing 271 and having a circular cross sectional shape, and a vertical hole communicating between the lateral hole and the inner side of the movable side cylinder casing 271 at a portion around the rear surface of the movable side cylinder casing 271. The communication holes 271c are formed at three positions of the thick wall part 271b at an equal interval in the peripheral direction. An interval between the communication holes 271c is not limited to equal interval, and the number of the communication holes 271c is not limited to that described above.

A sliding member 277 is slidably inserted in the lateral hole of the communication hole 271c. The sliding member 277 has an approximately column shape. The outer diameter of the sliding member 277 is set to be approximately the same with the inner diameter of the communication hole 271c (more specifically, slightly smaller than the inner diameter of the communication hole 271c so as to secure slidability). The length of the sliding member 277 in the longitudinal direction (front-rear direction) is set to be approximately the same as the longitudinal length of the lateral hole of the communication hole 271c.

Through holes 271d, 271d, . . . are formed in the portion around the front end of the movable side cylinder casing 271. The through holes 271d are formed through the outer peripheral surface and the inner peripheral surface of the cylinder portion of the movable side cylinder casing 271. The through holes 271d are formed at three positions of the movable side cylinder casing 271 at an equal interval in the peripheral direction. An interval between the through holes 271d is not limited to equal interval, and the number of the through holes 271d is not limited to that described above.

As shown in FIG. 2, the movable side cylinder casing 271 is fixedly disposed on the input side movable sheave 63 by means of a fastening member such as a bolt with the front surface of the input side movable sheave 63 being in contact with the rear surface of the movable side cylinder casing 271. The movable side cylinder casing 271 and the input side movable sheave 63 may be integrally formed by forging etc.

The fixed side cylinder casing 73 has a box shaped portion opened at a rear portion, and an annular flange portion integrally formed at the rear end of the box shaped portion. A through hole 73a is formed at the center of the front surface of the fixed side cylinder casing 73. The speed-change input shaft 50 is inserted in the through hole 73a. The rear portion (flange portion) of the fixed side cylinder casing 73 is inserted in the movable side cylinder casing 271 from the opened side (front side) of the movable side cylinder casing 271. More specifically, the rear portion (flange portion) of the fixed side cylinder casing 73 is inserted in the thick wall part 271b of the movable side cylinder casing 271. A seal member 74 is disposed between the fixed side cylinder casing 73 and the thick wall part 271b of the movable side cylinder casing 271.

After the fixed side cylinder casing 73 is inserted in the movable side cylinder casing 271, a contact member 278F and a contact member 278R are inserted to the inner side of a portion around the opened (front) side end of the movable side cylinder casing 271. The contact member 278F and the contact member 278R shown in FIG. 2 and FIG. 4 have a shape in which a hole is formed in the center of a disc shaped member (annular shape). The outer diameter of the contact member 278F and the contact member 278R are set to be approximately the same as the inner diameter of the cylinder portion of the movable side cylinder casing 271 (specifically, the portion on the front side of the cylinder portion (portion other than the thick wall portion 271b)) (more specifically, slightly smaller than the inner diameter of the cylinder portion of the movable side cylinder casing 271 so as to secure slidability). On the rear surface of the contact member 278F, oil grooves 278a are formed to communicate between the inner peripheral surface and the outer peripheral surface of the contact member 278F. Similarly, on the front surface of the contact member 278R, oil grooves 278b are formed to communicate between the inner peripheral surface and the outer peripheral surface of the contact member 278R. The contact member 278F and the contact member 278R are inserted in the movable side cylinder casing 271 with the rear surface of the contact member 278F being in contact with the front surface of the contact member 278R.

As shown in FIG. 2, after the contact member 278F and the contact member 278R are inserted in the movable side cylinder casing 271, inhibiting members 279, 279, . . . are fit in the through holes 271d, 271d, . . . (see FIG. 3) of the movable side cylinder casing 271. The inhibiting members 279 are fit in the through holes 271d from the outer side of the movable side cylinder casing 271, and the inner side ends of the inhibiting members 279 protrude from the inner peripheral surface of the movable side cylinder casing 271 toward the inner side. With such a configuration, the contact member 278F and the contact member 278R sliding forward contact the inhibiting members 279 at a predetermined position. Thus, the sliding movement of the contact member 278F and the contact member 278R can be inhibited.

The speed-change input shaft 50 is inserted in the bearing 53 at a position right in front of the fixed side cylinder casing 73, and is rotatably supported by the transmission case 8 through the bearing 53. A locknut 75 is fastened to the speed-change input shaft 50 at a portion right in front of the bearing 53. Thus, the bearing 53 can be prevented from sliding forward, and the fixed side cylinder casing 73 can be prevented from sliding forward through the bearing 53. The bearing 53, the fixed side cylinder casing 73, the movable side cylinder casing 271, the input side movable sheave 63, the belt 140, and the input side fixed sheave 61 are disposed between the locknut 62 and the locknut 75. Thus, the torque applied to the members can be confined between the locknut 62 and the locknut 75.

As described above, the hydraulic cylinder 270 is provided to the input side movable sheave 63 of the input pulley 60. In the hydraulic cylinder 270 having the configuration described above, a hydraulic chamber 76 is formed in a space defined by the input side movable sheave 63, the movable side cylinder casing 271, the fixed side cylinder casing 73, and the speed-change input shaft 50. A spool position maintaining mechanism according to the invention is formed of the sliding members 277, 277, . . . , the contact member 278F, the contact member 278R, the inhibiting members 279, 279, . . . , and the communication holes 271c, 271c, . . . of the movable side cylinder casing 271.

Figure 5:
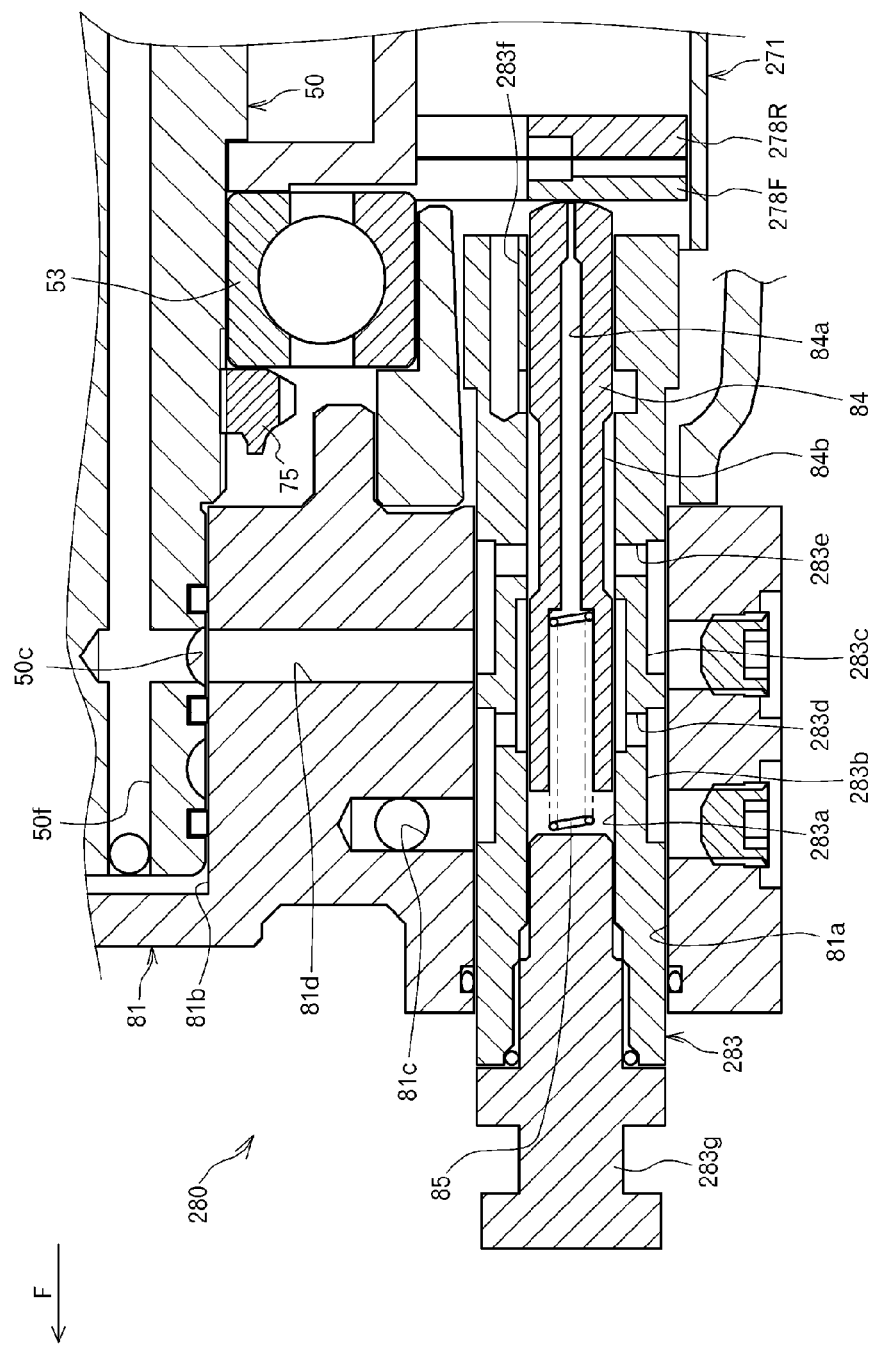
FIG. 5 It is an enlarged sideward cross-sectional view showing a servo spool and a feedback spool.

The hydraulic servo mechanism 280 shown in FIG. 2 and FIG. 5 controls the transmission of hydraulic oil to the hydraulic cylinder 270 and further controls the operation of the input side movable sheave 63 through the hydraulic cylinder 270. The hydraulic servo mechanism 280 includes a front casing 81, a servo spool 283, a feedback spool 84, a spool spring 285, etc.

The front casing 81 is a member in which an oil passage through which hydraulic oil is guided is formed. A valve chest 81a, a bearing hole 81b, a hydraulic oil port 81c, a communication oil passage 81d, etc. is formed in the front casing 81.

The valve chest 81a is a through hole having a circular cross-sectional shape formed to communicate between the front surface and the rear surface of the front casing 81. The valve chest 81a is formed with the axial direction thereof being the front-rear direction. The valve chest 81a is formed at a position overlapping the input side movable sheave 63 of the input pulley 60 in the front view, that is, the position facing the input side movable sheave 63.

The bearing hole 81b is a hole having a circular cross-sectional shape formed from the rear surface to a portion around the front end of the front casing 81. The bearing hole 81b is formed with the axial direction thereof being the front-rear direction. The front end portion of the speed-change input shaft 50 is inserted in the bearing hole 81b from the rear side.

The hydraulic oil port 81c is a through hole that communicates between the side surface of the main body of the front casing 81 and the valve chest 81a. More specifically, the hydraulic oil port 81c communicates between the side surface of the main body of the front casing 81 and a portion of the valve chest 81a slightly more on the front side than the approximately center portion in the axial direction. The hydraulic oil port 81c is coupled to a hydraulic oil pump, not illustrated, through a pipe etc. The hydraulic oil port 81c may have any shape and size as long as the port communicates between the outside of the front casing 81 and the valve chest 81a.

The communication oil passage 81d is an oil passage formed to communicate between the valve chest 81a and the bearing hole 81b. More specifically, the communication oil passage 81d communicates between a portion of the valve chest 81a slightly more on the rear side than the approximately center portion in the axial direction and an approximately center portion of the bearing hole 81b in the axial direction.

The servo spool 283 switches an oil passage in the hydraulic servo mechanism 280. The servo spool 283 has an approximately column shape with a large diameter portion having a larger diameter than the other portion formed at the rear end portion. The servo spool 283 is disposed with the axial direction being the front-rear direction. A sliding hole 283a, a first groove 283b, a second groove 283c, a first through hole 283d, a second through hole 283e, an exhaust oil passage 283f, etc. are formed in the servo spool 283.

The sliding hole 283a is a through hole having a circular cross-sectional shape formed through the rear end to the front end of the servo spool 283 on the axis of the servo spool 283. The front end of the sliding hole 283a is closed by a lid member 283g. The first groove 283b is formed along the outer peripheral surface of the servo spool 283 at a portion slightly more on the front side than the approximately center portion of the servo spool 283 in the axial direction. As will be described later, the first groove 283b is formed to be long in the axial direction of the servo spool 283 so that, even in a case where the servo spool 283 slides along the axial direction relative to the valve chest 281a of the front casing 81, the first groove 283b always faces the hydraulic oil port 81c regardless of the slid position of the servo spool 283. The second groove 283c is formed along the outer periphery of the servo spool 283 at a portion more on the rear side than the first groove 283b of the servo spool 283. As will be described later, the second groove 283c is formed to be long in the axial direction of the servo spool 283 so that, even in a case where the servo spool 283 slides along the axial direction relative to the valve chest 81 of the front casing 81, the second groove 283c always faces the communication oil passage 81d regardless of the slid position of the servo spool 283. The first through hole 283d has an axial direction orthogonal to the axis of the servo spool 283 and is formed to communicate between the first groove 283b and the sliding hole 283a. The second through hole 283e has an axial direction orthogonal to the axis of the servo spool 283 and thus is formed to communicate between the second groove 283c and the sliding hole 283a. The exhaust oil passage 283f is an oil passage formed to communicate between the rear end of the servo spool 283 and the sliding hole 283a. More specifically, the exhaust oil passage 283f communicates between the rear end of the servo spool 283 and a portion of the sliding hole 283a more on the rear side than the portion facing the second groove 283c.

Figure 6:
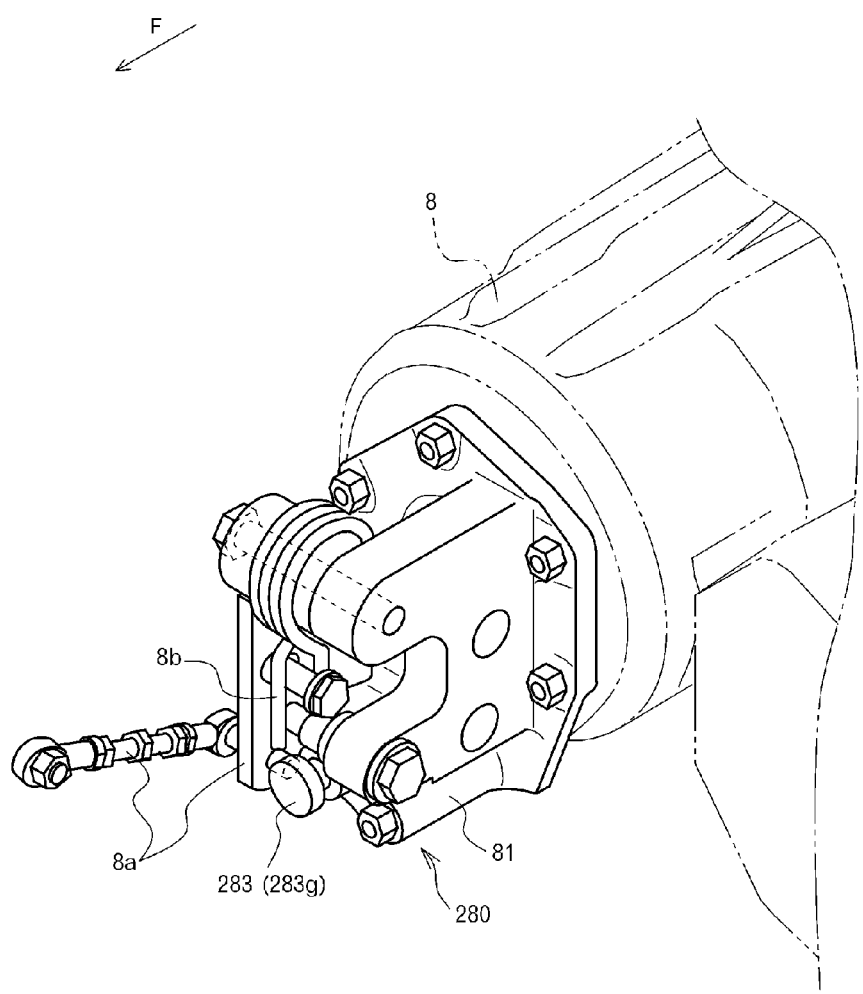
FIG. 6 It is a perspective view showing a link mechanism coupled to the servo spool.

The outer diameter of the servo spool 283 is set to be approximately the same with the inner diameter of the valve chest 81a of the front casing 81. The servo spool 283 is slidably inserted in the valve chest 81a of the front casing 81 from the rear side. The diameter of the large diameter portion of the servo spool 283 is set to be larger than the diameter of the valve chest 81a of the front casing 81. The diameter of the large diameter portion of the servo spool 283 is set to be larger than the diameter of the valve chest 81a of the front casing 81. When the large diameter portion contacts the front casing 81, forward sliding of the servo spool 283 is inhibited at a predetermined portion. As shown in FIG. 6, the front end (lid member 283g) of the servo spool 283 protrudes toward the front side from the front surface of the front casing 81. The front end portion (lid member 283g) of the servo spool 283 is coupled to a speed-change controller, not illustrated, such as a gear shift and a change pedal through a link mechanism 8a. The servo spool 283 can be slid in the forward-rear direction through an operation on the speed-change controller. A return spring 8b is provided in the link mechanism 8a. The link mechanism 8a is constantly biased so as to return to a neutral position by the return spring 8b so that the servo spool 283 is constantly biased so as to return to the neutral position. "Neutral position" of the servo spool 283 is a slid position of the servo spool 283 at the point where no driving force is transmitted to the output shaft 170 (revolution of the output shaft 170 is 0) as a result of changing the driving force from the engine in the belt-type continuously variable transmission 40. Overview of the driving force transmission and the speed change in the belt-type continuously variable transmission 40 will be described later The feedback spool 84 shown in FIG. 2 and FIG. 5 switches oil passage in the hydraulic servo mechanism 280. The feedback spool 84 is a substantially columnar shaped member. The feedback spool 84 is arranged so that the axial direction thereof is along the longitudinal direction. A discharge oil passage 84a, a communication groove 84b, etc. is formed in the feedback spool 84.

The discharge oil passage 84a is formed on the axis of the feedback spool 84 to communicate between the front and rear ends of the feedback spool 84. The communication groove 84b is formed along the outer peripheral surface of the feedback spool 84 at an approximately center portion of the feedback spool 84 in the axial direction.

The outer diameter of the feedback spool 84 is set to be approximately the same with the inner diameter of the sliding hole 283a of the servo spool 283. The feedback spool 84 is slidably inserted in the sliding hole 283a of the servo spool 283. Thus, the feedback spool 84 is slidable in the front-rear direction with respect to the servo spool 283.

A spool spring 85 biases the feedback spool 84 toward the rear side. The spool spring 85 is formed of a compression coil spring. The spool spring 85 is disposed in the sliding hole 283a of the servo spool 283 and constantly biasbiases the feedback spool 84 toward the rear side (that is, toward the input side movable sheave 63).

The biasing member is not limited to the compression coil spring (spool spring 85) and any configuration may be employed as long as the feedback spool 84 can be biased toward the rear side.

With the feedback spool 84 being constantly biased toward the rear side by the spool spring 85, the rear end of the feedback spool 84 is constantly in contact with the front surface of the contact member 278F inserted in the movable side cylinder casing 271.

A first groove 50c, an operation groove 50e, and a hydraulic oil passage 50f are formed in the speed-change input shaft 50 illustrated in FIG. 2.

The first groove 50c is formed along the outer periphery of the speed-change input shaft 50 at a portion of the speed-change input shaft 50 around the front end portion in the axial direction. More specifically, the first groove 50c is formed at an axial direction position facing the communication oil passage 81d formed in the front casing 81 when the speed-change input shaft 50 is inserted in the bearing hole 81b of the front casing 81. The operation groove 50e is formed in a part of the outer periphery surface of the speed-change input shaft 50 at an intermediate portion of the speed-change input shaft 50 in the axial direction. More specifically, the operation groove 50e is formed at a position facing the through hole 63d formed in the input side movable sheave 63 when the input side movable sheave 63 is supported by the speed-change input shaft 50. The operation groove 50e is formed to be long in the axial direction of the speed-change input shaft 50 so that, even in a case where the input side movable sheave 63 slides along the axial direction relative to the speed-change input shaft 50, the operation groove 50e always faces the through hole 63d regardless of the slid position of the movable sheave. The hydraulic oil passage 50f is a hole formed from the front end of the speed-change input shaft 50 to approximately the same position as the operation groove 50e in the axial direction. The front end portion of the hydraulic oil passage 50f is closed by a plug. The hydraulic oil passage 50f communicates with the first groove 50c at a portion around the front end portion and with the operation groove 50e at a portion around the rear end portion.

How the operation of the hydraulic cylinder 270 is controlled with the hydraulic servo mechanism 280 having the configuration described above and the input side movable sheave 63 is slid is described below.

First of all, a case where the servo spool 283 is at a position (neutral position) illustrated in FIG. 2 will be described.

Here, a predetermined pressure is applied by the hydraulic oil pumped from the hydraulic oil pump to the oil passage in the hydraulic servo mechanism 280 (the hydraulic oil port 81c, the communication oil passage 81d, etc.), the oil passage in the speed-change input shaft 50 (the hydraulic oil passage 50f, the operation groove 50e, etc.), the oil passage in the input side movable sheave 63 (through hole 63d), and hydraulic chamber 76. The pressure of the hydraulic oil is applied to the rear end of the sliding members 277 through the communication holes 271c formed in the movable side cylinder casing 271. The pressure makes the sliding members 277 slide forward. The front end of the sliding member 277 comes into contact with the rear surface of the contact member 278R, and the sliding member 277 presses the contact member 278R and the contact member 278F forward. Thus, the contact member 278R and the contact member 278F also slide forward. The contact member 278R and the contact member 278F slide forward to a position to come into contact with the inhibiting members 279 and are maintained thereat.

The feedback spool 84 that comes into contact with the contact member 278F from the forward side is maintained at a state of being pressed to a predetermined position relative to the sliding hole 283a of the servo spool 283 against biasing force of the spool spring 85.

Here, the "predetermined position" of the feedback spool 84 is a position relative to the servo spool 283. More specifically, the predetermined position is a position where the outer peripheral surface of the feedback spool 84 (more specifically, a portion of the outer peripheral surface more on the front side than the communication groove 84b) closes the first through hole 283d of the servo spool 283, and the outer peripheral surface of the feedback spool 84 (more specifically, a portion of the outer peripheral surface more on the rear side than the communication groove 84b) closes the exhaust oil passage 283f of the servo spool 283.

The hydraulic oil pumped from the hydraulic oil pump is supplied to the first groove 283b of the servo spool 283 through the hydraulic oil port 81c of the front casing 81. However, the first through hole 283d communicating between the first groove 283b and the sliding hole 283a is closed by the outer peripheral surface of the feedback spool 84. Thus, the hydraulic oil supplied from the hydraulic oil pump is blocked by the feedback spool 84, and thus is not supplied to the hydraulic chamber 76 of the hydraulic cylinder 270.

The input side movable sheave 63 is biased toward the front side by tensile force of the belt 140, which is to be described later, wound around the input pulley 60. The input side movable sheave 63 and the movable side cylinder casing 271 are held at the state after sliding forward.

Figure 7:
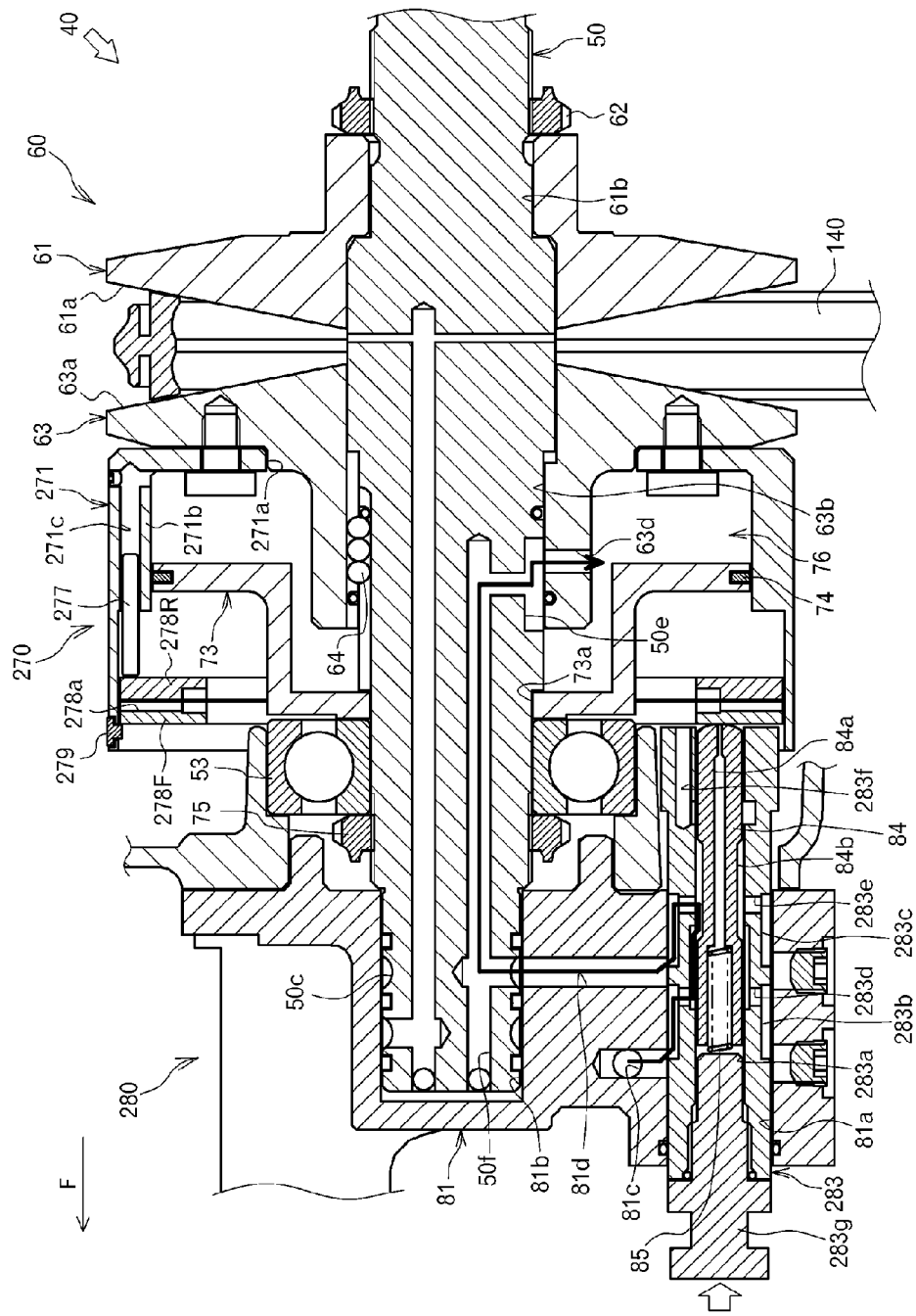
FIG. 7 It is a sideward cross-sectional view showing the case in which the servo spool is slid backward.

Next, a case where the servo spool 283 has slid rearward through an operation on the speed-change controller as shown in FIG. 7 will be described.

Here, while the servo spool 283 slides rearward, the feedback spool 84 is in contact with the contact member 278F and thus cannot slide rearward. Thus, the feedback spool 84 slides forward relative to the servo spool 283. As a result, the communication groove 84b of the feedback spool 84 faces the first through hole 283d and the second through hole 283e of the servo spool 283. Thus, the hydraulic oil supplied to the hydraulic oil port 81c from the hydraulic oil pump is supplied to the communication oil passage 81d through the first groove 283b, the first through hole 283d, the communication groove 84b, the second groove 283c, and the second through hole 283e.

The hydraulic oil supplied to the communication oil passage 81d is further supplied to the hydraulic chamber 76 through the first groove 50c, the hydraulic oil passage 50f, and the operation groove 50e of the speed-change input shaft 50, and the through hole 63d of the input side movable sheave 63. When the hydraulic oil is supplied to the hydraulic chamber 76, the pressure in the hydraulic chamber 76 rises, and the input side movable sheave 63 and the movable side cylinder casing 271 are biased toward the rear side by the pressure. The input side movable sheave 63 and the movable side cylinder casing 271 thus biased toward the rear side by the pressure of the hydraulic oil slide rearward against the biasing force toward the front side produced by the tensile force of the belt 140 (see FIG. 8).

Figure 8:
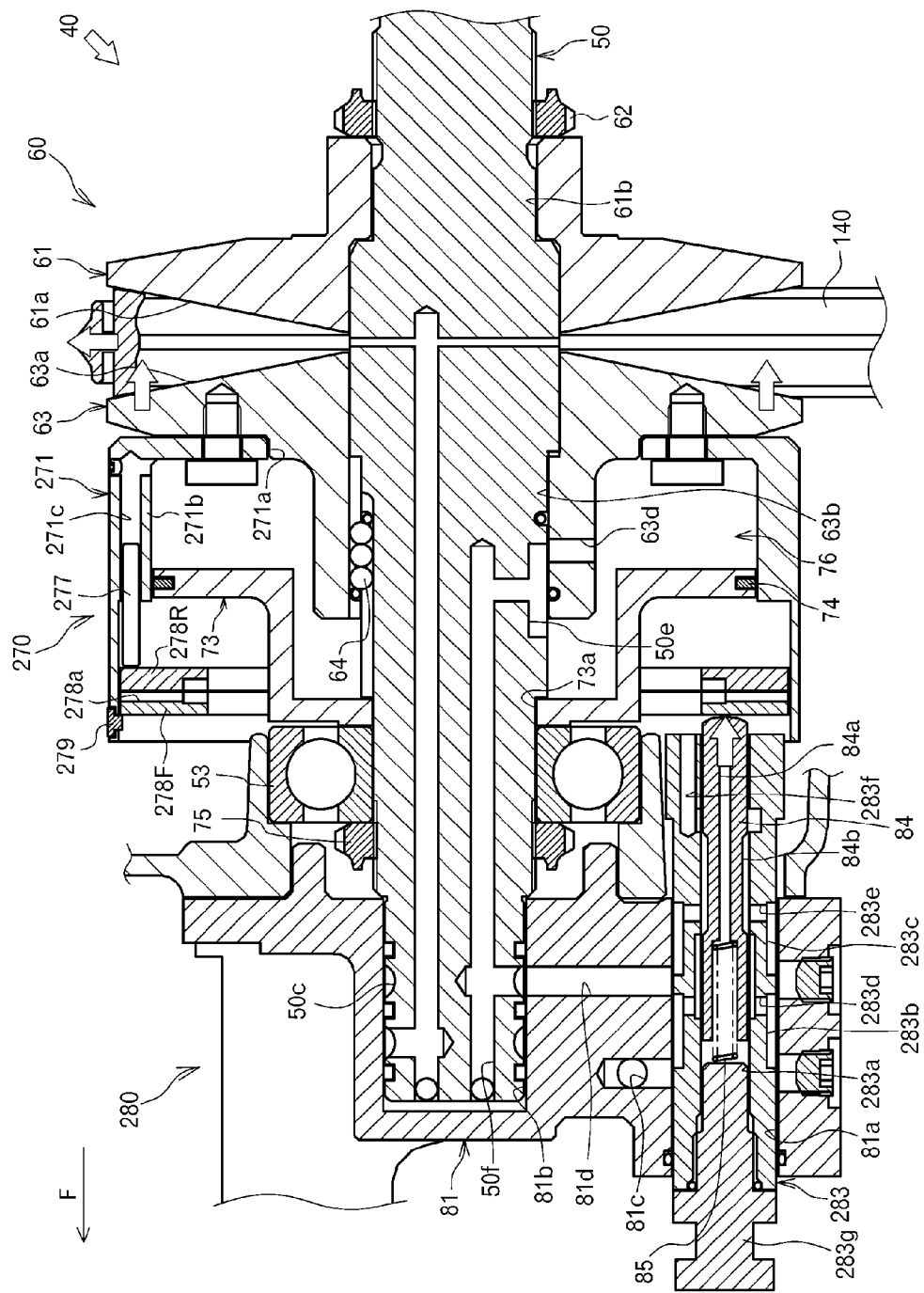
FIG. 8 It is a sideward cross-sectional view showing the case in which an input side movable sheave is slid backward.

Next, a case where the input side movable sheave 63 and the movable side cylinder casing 271 have slid rearward as shown in FIG. 8 will be described.

When the input side movable sheave 63 and the movable side cylinder casing 271 slide rearward, the contact member 278F and the contact member 278R also slide rearward together with the movable side cylinder casing 271. When the contact member 278F slides rearward, the feedback spool 84 in contact with the contact member 278F, while being biased from the front side, also slides rearward. Thus, the feedback spool 84 slides rearward relative to the servo spool 283.

When the feedback spool 84 slides to the predetermined position, and thus the first through hole 283d of the servo spool 283 is again closed by the outer periphery surface of the feedback spool 84, the supply of the hydraulic oil to the hydraulic chamber 76 of the hydraulic cylinder 270 is terminated. Thus, the input side movable sheave 63 and the movable side cylinder casing 271 are maintained at the point where the supplying of the hydraulic oil to the hydraulic chamber 76 is terminated.

Figure 9:
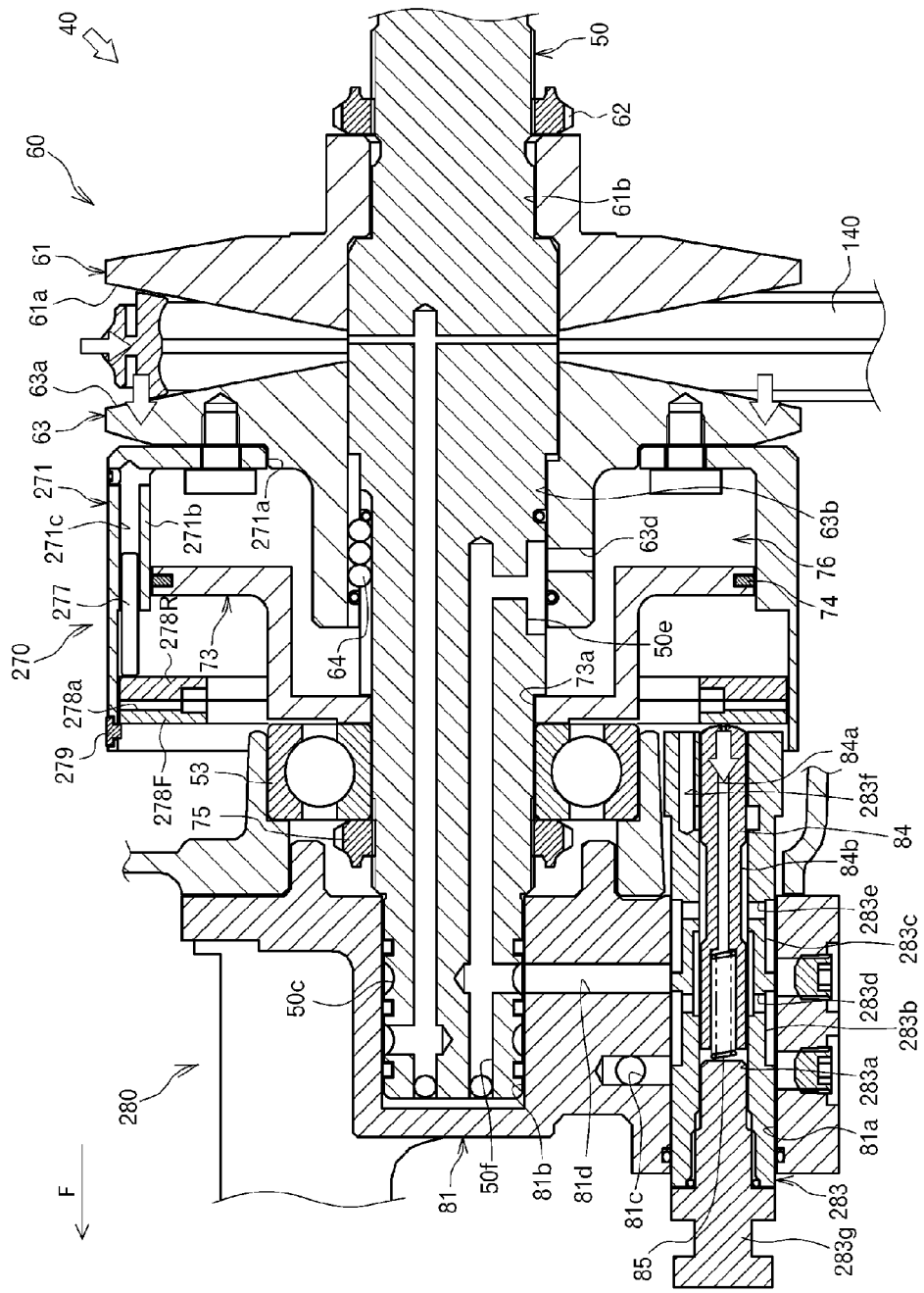
FIG. 9 It is a sideward cross-sectional view showing the case in which operating fluid leaks out and pressure in a hydraulic chamber drops.

Next, a case where the pressure in the hydraulic chamber 76 has dropped due to the leakage of the hydraulic oil from the hydraulic chamber 76 of the hydraulic cylinder 270 as illustrated in FIG. 9 will be described.

When the supplying of the hydraulic oil to the hydraulic chamber 76 is terminated in the state where the input side movable sheave 63 and the movable side cylinder casing 271 have slid rearward, the input side movable sheave 63 and the movable side cylinder casing 271 are maintained at positions at the point where the supplying of the hydraulic oil to the hydraulic chamber 76 is terminated. However, as the hydraulic oil in the hydraulic chamber 76 gradually leaks out through a gap between the movable side cylinder casing 271 and the fixed side cylinder casing 73, a gap between the input side movable sheave 63 and the speed-change input shaft 50, etc., the pressure in the hydraulic chamber 76 drops, and the tensile force of the belt 140 makes the input side movable sheave 63 and the movable side cylinder casing 271 gradually slide forward.

When the input side movable sheave 63 and the movable side cylinder casing 271 slide forward, the feedback spool 84 in contact with the contact member 278F also slides forward. Thus, the feedback spool 84 slides forward relative to the servo spool 283.

Figure 10:
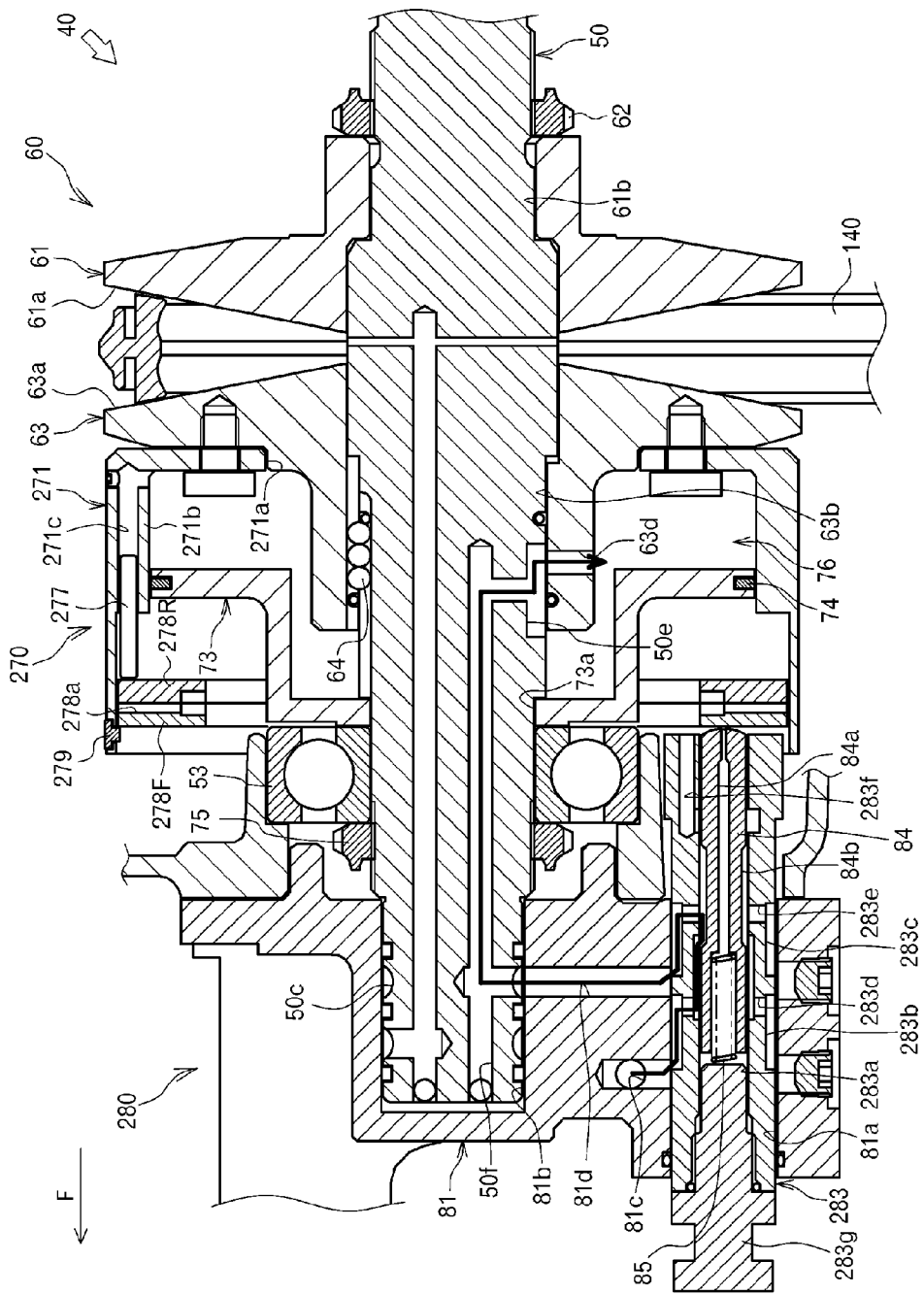
FIG. 10 It is a sideward cross-sectional view showing the state in which operating fluid is once again supplied to the hydraulic chamber.

When the feedback spool 84 slides forward, and the communication groove 84b of the feedback spool 84 again faces the first through hole 283d and the second through hole 283e of the servo spool 283, as illustrated in FIG. 10, the hydraulic oil is again supplied to the hydraulic chamber 76 of the hydraulic cylinder 270. Thus, the input side movable sheave 63 and the movable side cylinder casing 271 slide rearward (see FIG. 8).

When the feedback spool 84 slides together with the input side movable sheave 63 and the movable side cylinder casing 271 to the predetermined position, and thus the first through hole 283d of the servo spool 283 is again closed by the outer periphery surface of the feedback spool 84, the supplying of the hydraulic oil to the oil chamber 76 of the hydraulic cylinder 270 is terminated. As described above, the feedback spool 84 slides along with the input side movable sheave 63 and the movable side cylinder casing 271 so that the oil passage in communication with the hydraulic chamber 76 is switched, and thus the input side movable sheave 63 and the movable side cylinder casing 271 can be maintained at positions corresponding to the slid position of the servo spool 283.

Figure 11:
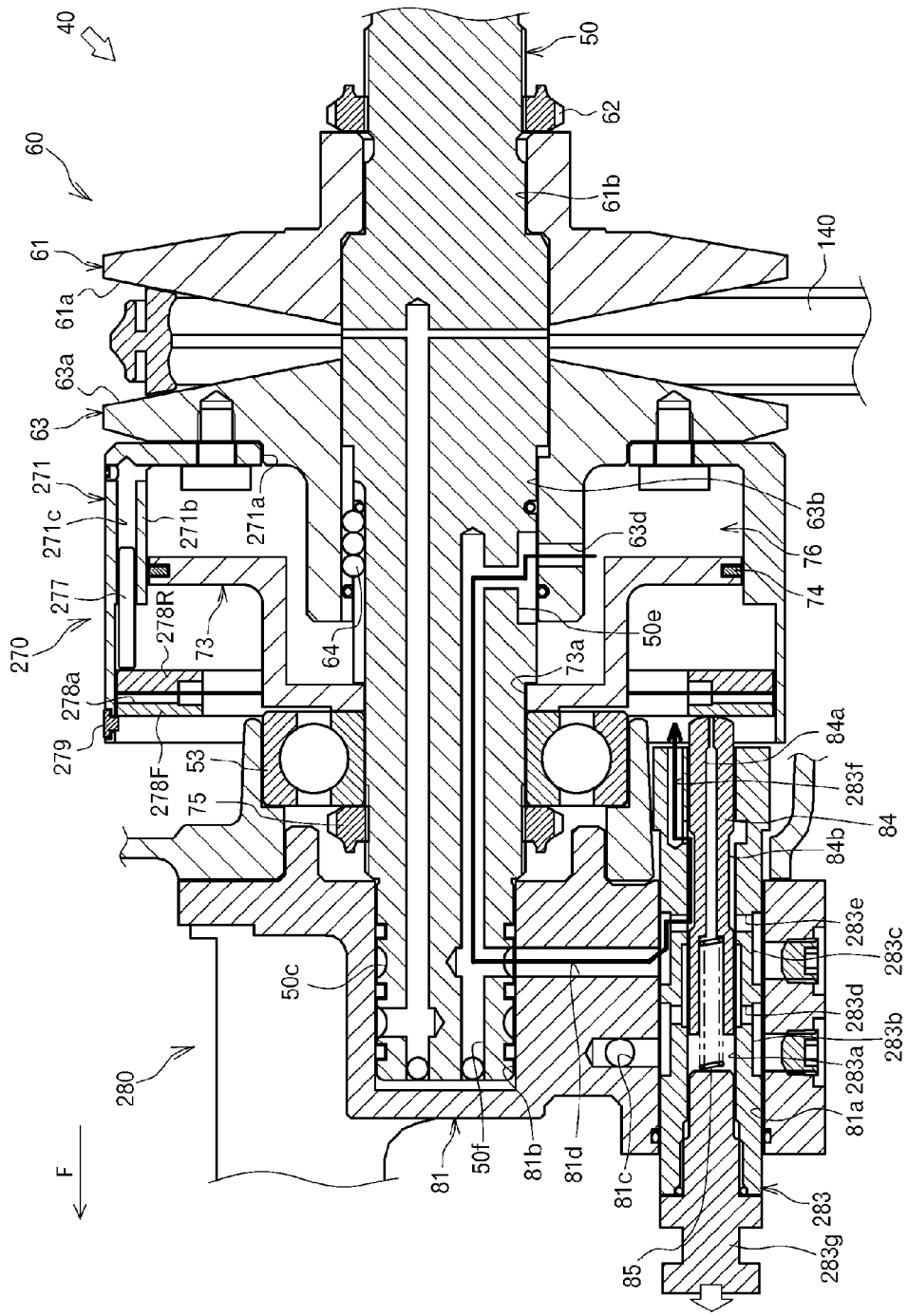
FIG. 11 It is a sideward cross-sectional view showing the case in which the servo spool is slid forward.

Next, a state where the servo spool 283 has slid forward through an operation on the speed-change controller as shown in FIG. 11 will be described.

Here, while the servo spool 283 slides forward, the feedback spool 84 is maintained at a state of being in contact with the contact member 278F, because the feedback spool 84 is biased towards the contact member 278F by the spool spring 85. Thus, the feedback spool 84 slides rearward relative to the servo spool 283. Thus, the communication groove 84b of the feedback spool 84 faces the second through hole 283e and the exhaust oil passage 283f of the servo spool 283, and thus the hydraulic oil can flow to the exhaust oil passage 283f through the second groove 283c and the second through hole 283e.

The tensile force of the belt 140 biases the input side movable sheave 63 and the movable side cylinder casing 271 toward the front side. Thus, the hydraulic oil in the hydraulic chamber 76 of the hydraulic cylinder 270 is pushed out by the input side movable sheave 63 and the movable side cylinder casing 271. Thus, the hydraulic oil passes through the through hole 63d of the input side movable sheave 63, the operation groove 50e, the hydraulic oil passage 50f, and the first groove 50c of the speed-change input shaft 50, the communication oil passage 81d, the second groove 283c and the second through hole 283e of the servo spool 283, the communication groove 84b of the feedback spool 84, and the exhaust oil passage 283f of the servo spool 283, to be discharged to the rear side from the rear end of the servo spool 283. The contact member 278F can be lubricated by the hydraulic oil discharged from the rear end of the servo spool 283. When the hydraulic oil in the hydraulic chamber 76 is discharged, the input side movable sheave 63 and the movable side cylinder casing 271 slide forward by the biasing force from the belt 140 (see FIG. 2).

Here, the first through hole 283d of the servo spool 283 is still closed by the outer periphery surface of the feedback spool 84. Thus, the hydraulic oil from the hydraulic oil pump is not supplied to the hydraulic chamber 76 of the hydraulic cylinder 270.

Next, a case where the input side movable sheave 63 and the movable side cylinder casing 271 have slid forward as shown in FIG. 2 will be described.

When the input side movable sheave 63 and the movable side cylinder casing 271 slide forward, the feedback spool 84 in contact with the contact member 278F also slides forward. Thus, the feedback spool 84 slides forward relative to the servo spool 283.

When the feedback spool 84 slides to the predetermined position so that the exhaust oil passage 83f of the servo spool 283 is closed by the outer periphery surface of the feedback spool 84, the discharge of the hydraulic oil from the hydraulic chamber 76 of the hydraulic cylinder 270 is terminated. Thus, the input side movable sheave 63 and the movable side cylinder casing 271 are maintained at positions at the point where the discharge of the hydraulic oil from the hydraulic chamber 76 is terminated.

As described above, by sliding the servo spool 283 to an appropriate position, the input side movable sheave 63 can be slid to a desired position. Moreover, the feedback spool 84 that slides along with the input side movable sheave 63 can maintain the input side movable sheave 63 at the desired slid position.

In this embodiment, sliding of the input side movable sheave 63 is caused by the hydraulic servo mechanism 280. However, the present invention is not limited to this. A configuration in which the sliding of an output side movable sheave 103 of the output pulley 100, which will be described later, is caused by the hydraulic servo mechanism 280 can also be employed.

Figure 12:
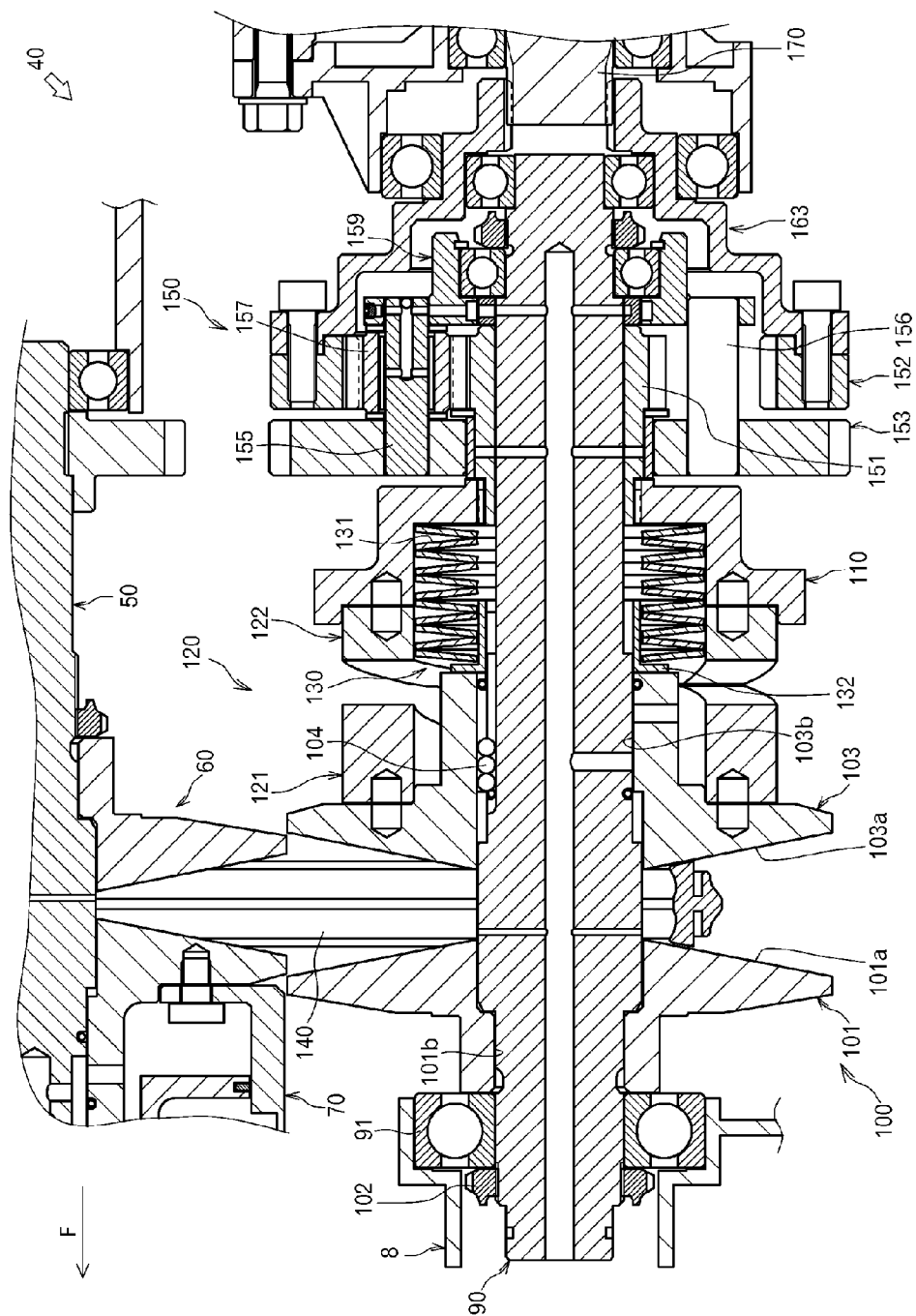
FIG. 12 It is a sideward cross-sectional view showing an output pulley, a cam mechanism, a biasing member, etc. of the belt-type continuously variable transmission.
Figure 13:
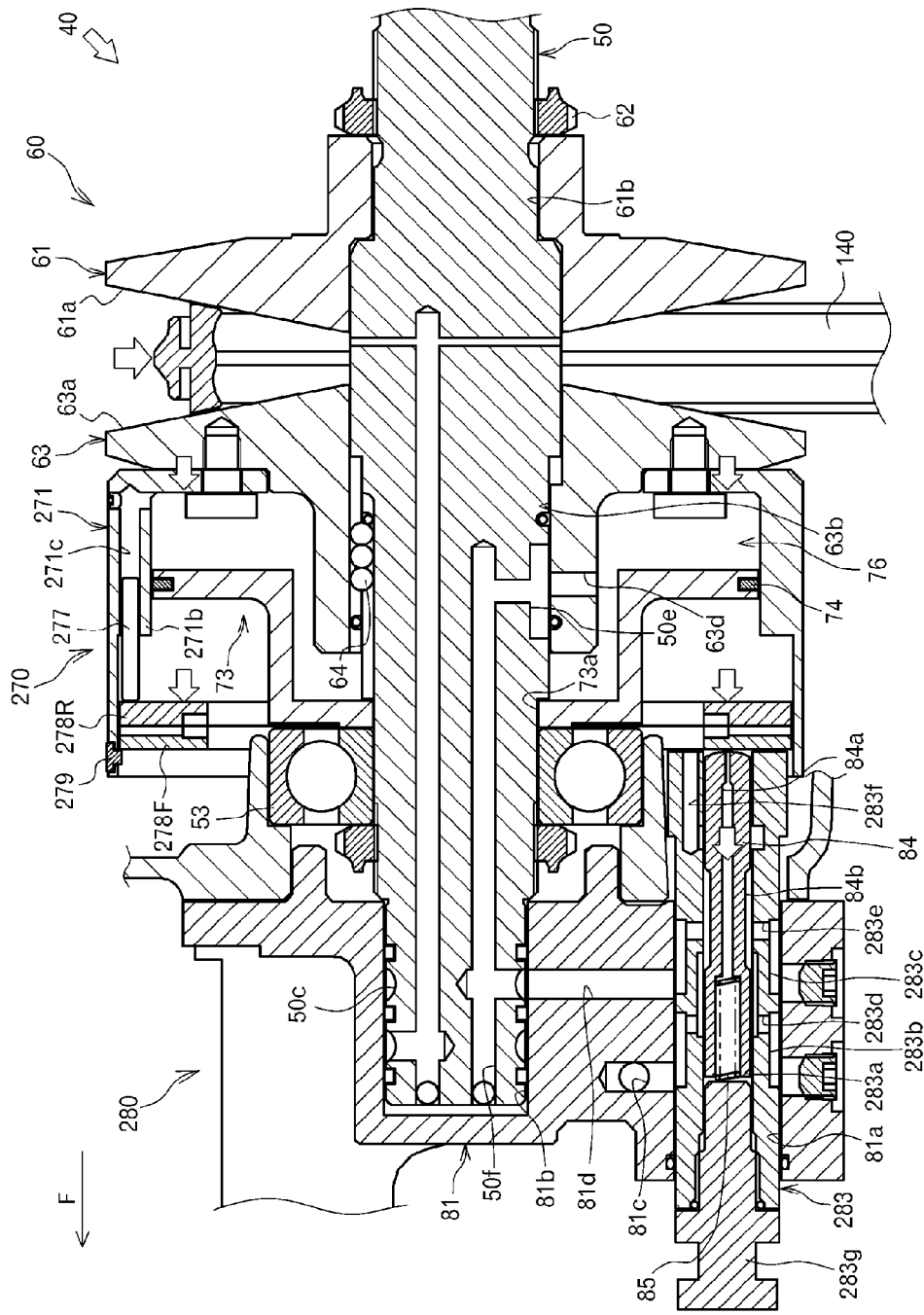
FIG. 13 It is a sideward cross-sectional view showing the case in which pressure in the hydraulic chamber drops to slide forward the input side movable sheave.

The transmission shaft 90 shown in FIG. 1 and FIG. 12 transmits the driving force from the speed-change input shaft 50. The transmission shaft 90 has an approximately column shape and is disposed with its axial direction being the front-rear direction. A bearing 91 fits the transmission shaft 90 at a portion around the front end portion. With the bearing 91 supported by the transmission case 8, the transmission shaft 90 is rotatably supported by the transmission case 8.

The output pulley 100 illustrated in FIG. 12 is disposed on the transmission shaft 90 and includes a pair of sheaves. The output pulley 100 includes an output side fixed sheave 101, the output side movable sheave 103, etc.

The output side fixed sheave 101 and the input side fixed sheave 61 are formed by the same material and have the same shape. That is, the output side fixed sheave 101 is a member which has a shaft cylinder portion with an approximately cylindrical shape and a sheave portion with an annular shape. The sheave portion is integrally formed at the front end of the shaft cylinder portion, and has an approximately truncated cone shape in the sideward cross-sectional view. The sheave portion is arranged rearward of the shaft cylinder portion, and the output side fixed sheave 101 is fitted on the transmission shaft 90. A rear surface 101a of the sheave portion of the output side fixed sheave 101 is formed as a tilt surface whose diameter increases from the rear toward the front. And a through hole 101b is formed on the axis of the output side fixed sheave 101. The through hole 101b penetrates the output side fixed sheave 101 in the front-back direction. The transmission shaft 90 is inserted into the through hole 101b of the output side fixed sheave 101 from rear. The transmission shaft 90 is press-fitted to the through hole 101b, whereby the output side fixed sheave 101 is fixed so as not to be rotatable relatively with respect to the transmission shaft 90 and not to be slidable.

In this embodiment, the transmission shaft 90 and the output side fixed sheave 101 are press fitted (fitted) with each other. Alternatively, any fitting method utilizing the configuration that the transmission shaft 90 has a larger diameter than the through hole 101b of the output side fixed sheave 101, such as "shrink fitting" and "expansion fitting" may be used.

The transmission shaft 90 is inserted in the bearing 91 described above at a portion right in front of the output side fixed sheave 101, and is rotatably supported by the transmission case 8 through the bearing 91. A locknut 102 is fastened to the transmission shaft 90 at a portion right in front of the bearing 91. Thus, the bearing 91 is prevented from sliding forward so that the output side fixed sheave 101 is prevented from sliding forward through the bearing 91, and the output side fixed sheave 101 can be surely fixed to the transmission shaft 90.

The output side movable sheave 103 and the input side movable sheave 63 are formed of the same material and have the same shape. That is, the output side movable sheave 103 is a member which has a shaft cylinder portion with an approximately cylindrical shape and a sheave portion with an annular shape. The sheave portion is integrally formed at the rear end of the shaft cylinder portion, and has an approximately truncated cone shape in the sideward cross-sectional view. The output side movable sheave 103 is fitted on the outer side of the transmission shaft 90 and disposed more on the rear side than the output side fixed sheave 101 with the sheave portion disposed more on the front side than the shaft cylinder portion. A front surface 103a of the sheave portion of the output side movable sheave 103 is formed as a tilt surface whose diameter increases from the front toward the rear. A through hole 103b formed through the output side movable sheave 103 in the front-rear direction is formed on the axis of the output side movable sheave 103. The transmission shaft 90 is inserted in the through hole 103b of the output side movable sheave 103 from the front side. The rear surface 101a of the output side fixed sheave 101 and the front surface 103a of the output side movable sheave 103 face each other on the transmission shaft 90. Thus, a groove of the output pulley 100 is defined by the rear surface 101a and the front surface 103a. Grooves along the axial direction of the transmission shaft 90 are respectively formed on an inner periphery surface of the through hole 103b and an outer periphery surface of the transmission shaft 90. The grooves are formed at three portions in the inner periphery surface of the through hole 103b and the outer periphery surface of the transmission shaft 90 at an equal interval in the peripheral direction. Steel balls 104, 104, . . . are disposed in a pair of grooves facing each other. Thus, the output side movable sheave 103 is supported by the transmission shaft 90 in such a manner as to be slidable in the axial direction and not to be relatively rotatable.

As described above, the same members are commonly used for the input side fixed sheave 61 and the input side movable sheave 63 of the input pulley 60, and the output side fixed sheave 101 and the output side movable sheave 103 of the output pulley 100. Thus, the number of component types can be reduced and thus, the component cost can be reduced.

The output member 110 transmits the driving force from the cam mechanism 120 to the planetary gear mechanism 150. The output member 110 is a member which has a shaft cylinder portion with an approximately cylindrical shape including a bottom face (rear face), and a flange portion with an annular shape. The flange portion is integrally formed at the front end of the shaft cylinder portion. The output member 110 is disposed at a portion more on the rear side than the output pulley 100 with the transmission shaft 90 inserted in the through hole of the output member 110.

The cam mechanism 120 allows the transmission of a torque between the output pulley 100 and the output member 110. The cam mechanism 120 includes a first cam 121, a second cam 122, etc.

The first cam 121 has an approximately cylindrical shape. The first cam 121 is disposed with its axial direction extending in the front-rear direction, and its axis matching the axis of the transmission shaft 90. A through hole having a predetermined inner diameter is formed on an axis of the first cam 121. On the front surface of the first cam 121, a flat surface orthogonal to the axial direction is formed, and on the rear surface of the first cam 121, a plurality of surfaces inclined by a predetermined angle with respect to the surface orthogonal to the axial direction and the like are formed. The shaft cylinder portion of the output side movable sheave 103 is inserted in the through hole of the first cam 121 from the front side. The first cam 121 is fixedly disposed on the output side movable sheave 103 by means of a fastening member such as a bolt, by welding, or by other means, with the rear surface of the sheave portion of the output side movable sheave 103 being in contact with the front surface of the first cam 121. The first cam 121 and the output side movable sheave 103 may be integrally formed by forging and the like.

The second cam 122 and the first cam 121 are formed of the same material and have the same shape. Specifically, the second cam 122 is disposed with its axial direction extending in the front-rear direction, and with its axis matching the axis of the transmission shaft 90. A through hole having a predetermined inner diameter is formed on the axis of the second cam 122. On the rear surface of the second cam 122, a flat surface orthogonal to the axial direction is formed, and on the front surface of the second cam 122, a plurality of surfaces inclined by a predetermined angle with respect to the surface orthogonal to the axial direction and the like are formed. The transmission shaft 90 is inserted in the through hole of the second cam 122 from the front side. The second cam 122 is fixedly disposed on the output member 110 by means of a fastening member such as a bolt, by welding, or by other means, with the front surface the output member 110 being in contact with the rear surface of the second cam 122. As a result, the rear surface of the first cam 121 and the front surface of the second cam 122 face each other. The second cam 122 and the output member 110 may be integrally formed by forging and the like.

The biasing member 130 biases the output side movable sheave 103 toward the front side. The biasing member 130 is disposed inside the output member 110 and includes a plurality of disc springs 131, 131, . . . arranged in the axial direction. The rear end of the biasing member 130 (the rearmost disc spring 131) comes into contact with the output member 110, while the front end of the biasing member 130

(the forward-most disc spring 131) comes into contact with the rear end of the output side movable sheave 103 with an inner guide member 132 disposed in between.

The belt 140 illustrated in FIG. 2 and FIG. 12 is wound around the grooves of the input pulley 60 and the output pulley 100. The belt 140 transmits the driving force from the input pulley 60 to the output pulley 100. The belt 140 is a metal belt including a band formed of stacked metallic thin plates and a metallic element. However, the present invention is not limited to this, and a rubber, chain, or resin belt may be used as the belt 140.

The belt 140 wound around the groove of the input pulley 60 is clamped by the input pulley 60 with the input side movable sheave 63 pressed toward the input side fixed sheave 61 with a predetermined strength by the hydraulic cylinder 270. The belt 140 wound around the groove of the output pulley 100 is clamped by the output pulley 100 with the output side movable sheave 103 pressed toward the output side fixed sheave 101 with a predetermined strength by the biasing force etc. of the biasing member 130.

The planetary gear mechanism 150 combines and outputs two driving forces. The planetary gear mechanism includes a sun gear 151, a ring gear 152, a carrier gear 153, planetary shafts 155, 155, . . . , coupling shafts 156, 156, . . . , planetary gears 157, 157, . . . , a supporting member 159, a planetary output member 163, etc.

The sun gear 151 is relatively rotatably supported by the transmission shaft 90 at a portion right behind the output member 110. Teeth are respectively formed on the front end portion and the rear end portion of the sun gear 151. The front end portion of the sun gear 151 is spline-fitted in the output member 110.

The ring gear 152 is a gear having teeth formed on the inner periphery surface of an annular member. The ring gear 152 is arranged on outer side of the rear end portion of the sun gear 151.

The carrier gear 153 is a gear having teeth formed on an outer periphery surface of an approximately disk shaped member. The carrier gear 153 is relatively rotatably supported by the sun gear 151 at an intermediate portion in the front-rear direction. The teeth of the carrier gear 153 mesh with the gear of the clutch mechanism 200 disposed on the mission input shaft 20. Thus, the driving force from the mission input shaft 20 can be transmitted through the clutch mechanism 200.

The planetary shafts 155, 155, . . . have an approximately column shape. The planetary shafts 155, 155, . . . have one ends (front ends) fit in the respective through holes formed in the carrier gear 153, and thus are fixed to the carrier gear 153. The other ends (rear ends) of the planetary shafts 155, 155, . . . extend rearward. Three planetary shafts 155, 155, . . . are arranged on the same circumference centering on the transmission shaft 90.

The coupling shafts 156, 156, . . . have an approximately column shape. The coupling shafts 156, 156, . . . have one ends (front ends) fit in the respective through holes formed in the carrier gear 153, and thus are fixed to the carrier gear 153. The other ends (rear ends) of the coupling shafts 156, 156, . . . extend rearward. Three coupling shafts 156, 156, . . . are arranged alternately with the planetary shafts 155, 155, . . . on the same circumference centering on the transmission shaft 90.

The planetary gears 157, 157, . . . are three gears that mesh with the teeth of the sun gear 151 and the teeth of the ring gear 152. The planetary shafts 155, 155, . . . are respectively inserted in the planetary gears 157, 157, . . . , and the planetary gears 157, 157, . . . are relatively rotatably supported by the planetary shafts 155, 155, . . . .

The supporting member 159 includes an appropriately cylindrical shaft cylinder portion and an annular flange integrally formed at the front end of the shaft cylinder portion. The supporting member 159 is relatively rotatably supported by the transmission shaft 90 through a bearing at a portion at a portion right behind the sun gear 151. Through holes are formed in the flange of the supporting member 159 and the rear end portions of the planetary shafts 155, 155, . . . and the rear end portions of the coupling shafts 156, 156, . . . are respectively inserted in the through holes.

The planetary output member 163 is a box shaped member opened at the front portion. A through hole is formed at the center of the rear surface of the planetary gear output member 163. The planetary output member 163 is disposed to cover the rear end portion of the transmission shaft 90 and the supporting member 159 from the rear side of the transmission shaft 90. A portion around the center of the planetary output member 163 in the front-rear direction is relatively rotatably supported to the transmission shaft 90 with a bearing provided in between. The front end of the planetary output member 163 is fastened to the ring gear 152 with bolts and is integrally rotatably coupled to the ring gear 152. The planetary output member 163 and the ring gear 152 may be integrally formed by forging and the like.

The output shaft 170 is spline-fitted to the rear end of the planetary output member 163. The driving force from the planetary output member 163 is transmittable to rear wheels (not shown) and the front wheel driving transmission shaft 180 of the tractor through the output shaft 170.

An overview of the driving force transmission and the speed-change in the belt-type continuously variable transmission 40 having the above described configuration will be described below.

When the driving force from the engine is transmitted to the speed-change input shaft 50 through the mission input shaft 20 and the clutch mechanism 200, the input pulley 60 rotates together with the speed-change input shaft 50. When the input pulley 60 rotates, the output pulley 100 is rotated through the belt 140. When output pulley 100 rotates, the first cam 121 fixedly disposed to the output pulley 100 rotates. When the first cam 121 rotates, the rear surface (inclined surface) of the first cam 121 comes into contact with the front surface (inclined surface) of the second cam 122, and the second cam 122 rotates along with the rotation of the first cam 121. When the second cam 122 rotates, the sun gear 151 of the planetary gear mechanism 150 is rotated through the output member 110. When the sun gear 151 rotates, the planetary gears 157, 157, . . . in mesh with the sun gear 151 rotate around the planetary shafts 155, 155, . . . (rotation).

When the driving force from the engine is transmitted to the carrier gear 153 of the planetary gear mechanism 150 through the mission input shaft 20 and the clutch mechanism 200 (that is, without being changed by the input pulley 60, the output pulley 100, and the belt 140), the planetary gears 157, 157, . . . supported by the carrier gear 153 rotates along with the carrier gear 153 around the transmission shaft 90 (revolution).

The driving force transmitted to the planetary gear mechanism 150 from the mission input shaft 20 through the belt 140 and the driving force directly transmitted to the planetary gear mechanism 150 from the mission input shaft 20 without passing through the belt 140 are combined by the planetary gears 157, 157, . . . of the planetary gear mechanism 150. The combined driving force is transmitted to the output shaft 170 through the ring gear 152 in mesh with the planetary gears 157, 157, . . . and the planetary output member 163.

The cam mechanism 120 can apply biasing force to the output side movable sheave 103 toward the front side in accordance with the torque transmitted to the second cam 122 from the first cam 121. More specifically, a torsion is produced between the first cam 121 and the second cam 122 based on the torque transmitted by the cam mechanism 120. Here, since the rear surface (inclined surface) of the first cam 121 and the front surface (inclined surface) of the second cam 122 are in contact with each other, the force in directions to separate the first cam 121 and the second cam 122 works in accordance with the contacted surfaces. The force makes the first cam 121 move in the direction to be separated from the second cam 122, and thus the output side movable sheave 103 is biased toward the output side fixed sheave 101. With this biasing force and the biasing force of the biasing member 130, the belt 140 can be clamped by the output pulley 100 with an appropriate strength.

When an operation of the hydraulic cylinder 270 is controlled so that the input side movable sheave 63 slides rearward, the distance between the rear surface 63a of the input side movable sheave 63 and the front surface 61a of the input side fixed sheave 61 (groove width of the input pulley 60) is shortened. When the groove width of the input pulley 60 is decreased, the diameter of the belt 140 wound around the input pulley 60 increases. Since the total length of the belt 140 is constant, the increase in the diameter of the belt 140 wound around the input pulley 60 makes the output side movable sheave 103 of the output pulley 100 slide rearward against the biasing force by the biasing member 130. Thus, the groove width of the output pulley 100 increases and the diameter of the belt 140 wound around the output pulley 100 decreases. With the diameter of the belt 140 wound around the input pulley 60 increased and the belt 140 wound around the output pulley 100 reduced as described above, the driving force to be transmitted to the planetary gear mechanism 150 through the belt 140 can be changed to the acceleration side.

When an operation of the hydraulic cylinder 270 is controlled so that a state where the hydraulic oil in the hydraulic chamber 76 can be discharged is achieved, the divided force of the tensile force of the belt 140 wound around the input pulley 60 toward the front side makes the input side movable sheave 63 slide forward, thereby increasing the groove width of the input pulley 60. The increase in the groove width of the input pulley 60 reduces the diameter of the belt 140 wound around the input pulley 60. Since the total length of the belt 140 is constant, the reduction in the diameter of the belt 140 wound around the input pulley 60 makes the output side movable sheave 103 of the output pulley 100 slide forward by the biasing force of the biasing member 130. Thus, the groove width of the output pulley 100 decreases and the diameter of the belt 140 wound around the output pulley 100 increases. With the diameter of the belt 140 wound around the input pulley 60 reduced and the diameter of the belt 140 wound around the output pulley 100 increased as described above, the driving force to be transmitted to the planetary gear mechanism 150 through the belt 140 can be changed to the deceleration side.

As described above, the driving force transmitted to the planetary gear mechanism 150 from the mission input shaft 20 through the belt 140 is changed. Thus, the driving force transmitted to the output shaft 170 through the planetary gear mechanism 150 can be changed from the normal rotation to the reverse rotation (i.e., from forward travel to backward travel).

An operation of the spool position maintaining mechanism at the point where the engine stops while the servo spool 283 is at the neutral position will be described.

When the engine stops while the servo spool 283 is at the neutral position (see FIG. 2), the hydraulic oil pump that pumps the hydraulic oil to the hydraulic chamber 76 also stops. Thus, the pressure in the hydraulic chamber 76 drops.

When the pressure in the hydraulic chamber 76 drops below a predetermined value, the input side movable sheave 63 slides forward (see FIG. 13) by the tensile force of the belt 140 applied by the biasing member 130 (see FIG. 12) etc. When the input side movable sheave 63 slides forward, the movable side cylinder casing 271, the sliding member 277, the contact member 278R, and the contact member 278F integrally slide forward along with the input side movable sheave 63. When the contact member 278F slides forward, the feedback spool 84 in contact with the contact member 278F from the front side also slides forward relative to the servo spool 283 against the biasing force of the spool spring 85. Here, the servo spool 283 does not slide but is maintained at the neutral position by the biasing force of the return spring 8b (see FIG. 6). Thus, the feedback spool 84 slides forward until the rear end thereof matches the rear end of the servo spool 283 (until the contact member 278F contacts the rear end of the servo spool 283).

Figure 14:
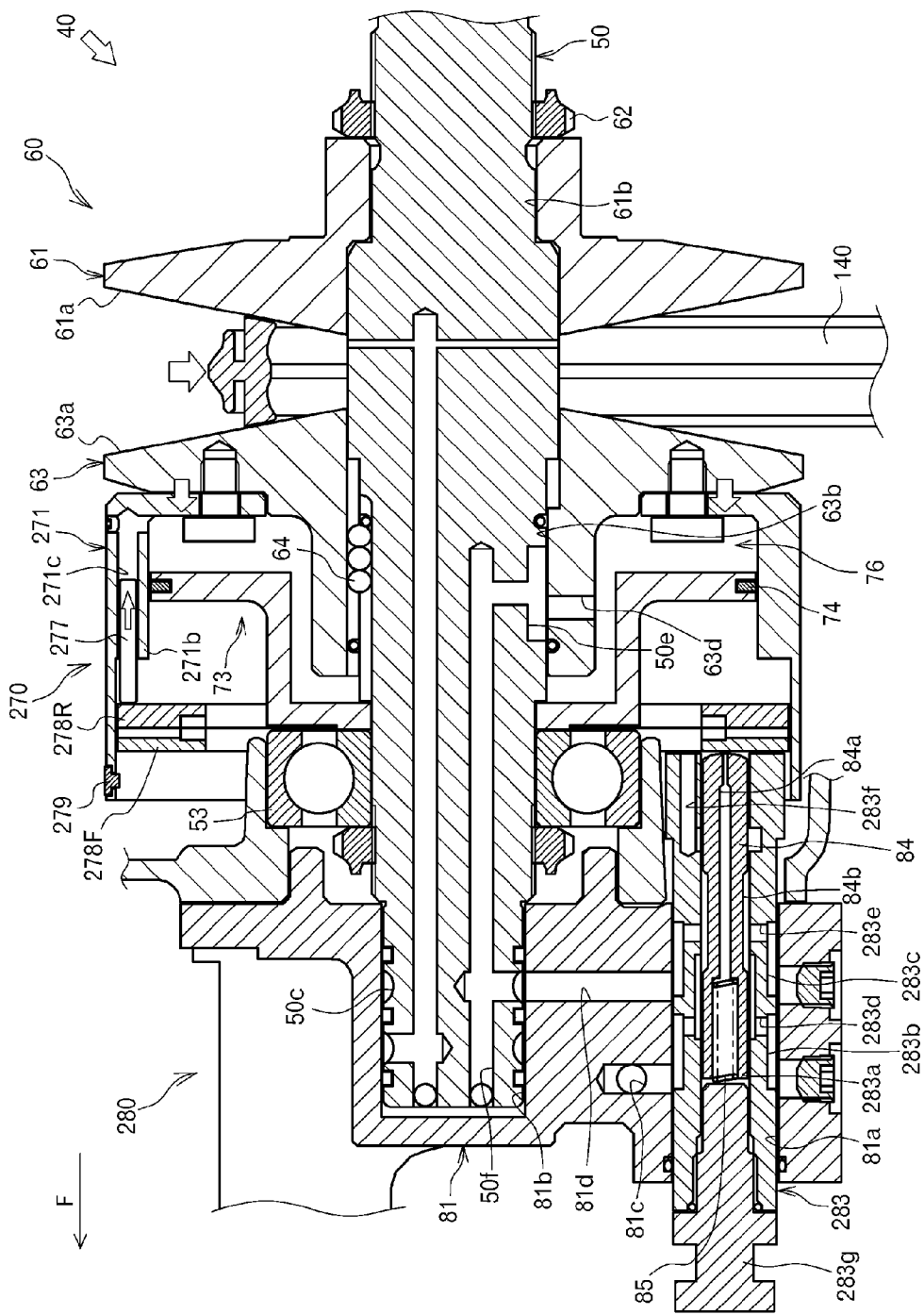
FIG. 14 It is likewise a sideward cross-sectional view showing the case in which the contact member slides in relation to the input side movable sheave.

As shown in FIG. 14, when the input side movable sheave 63 further slides forward by the tensile force of the belt 140, the movable side cylinder casing 271 also slides forward along with the input side movable sheave 63. Here, the contact member 278F is in contact with the servo spool 283 which is maintained at the neutral position by the return spring 8b, and thus cannot slide forward. Thus, while the movable side cylinder casing 271 keeps sliding forward, the contact member 278F and the contact member 278R are maintained at the positions. Specifically, the contact member 278F and the contact member 278R slide rearward relative to the movable side cylinder casing 271. Here, since the pressure in the hydraulic chamber 76 has dropped below the predetermined value, the sliding member 277 is pressed toward rear side by the contact member 278R. Thus, the "predetermined value" of the pressure in the hydraulic chamber 76 herein is a value low enough that the sliding member 277 cannot stand the biasing force of the return spring 8b and thus is pressed toward the rear side.

Figure 15:
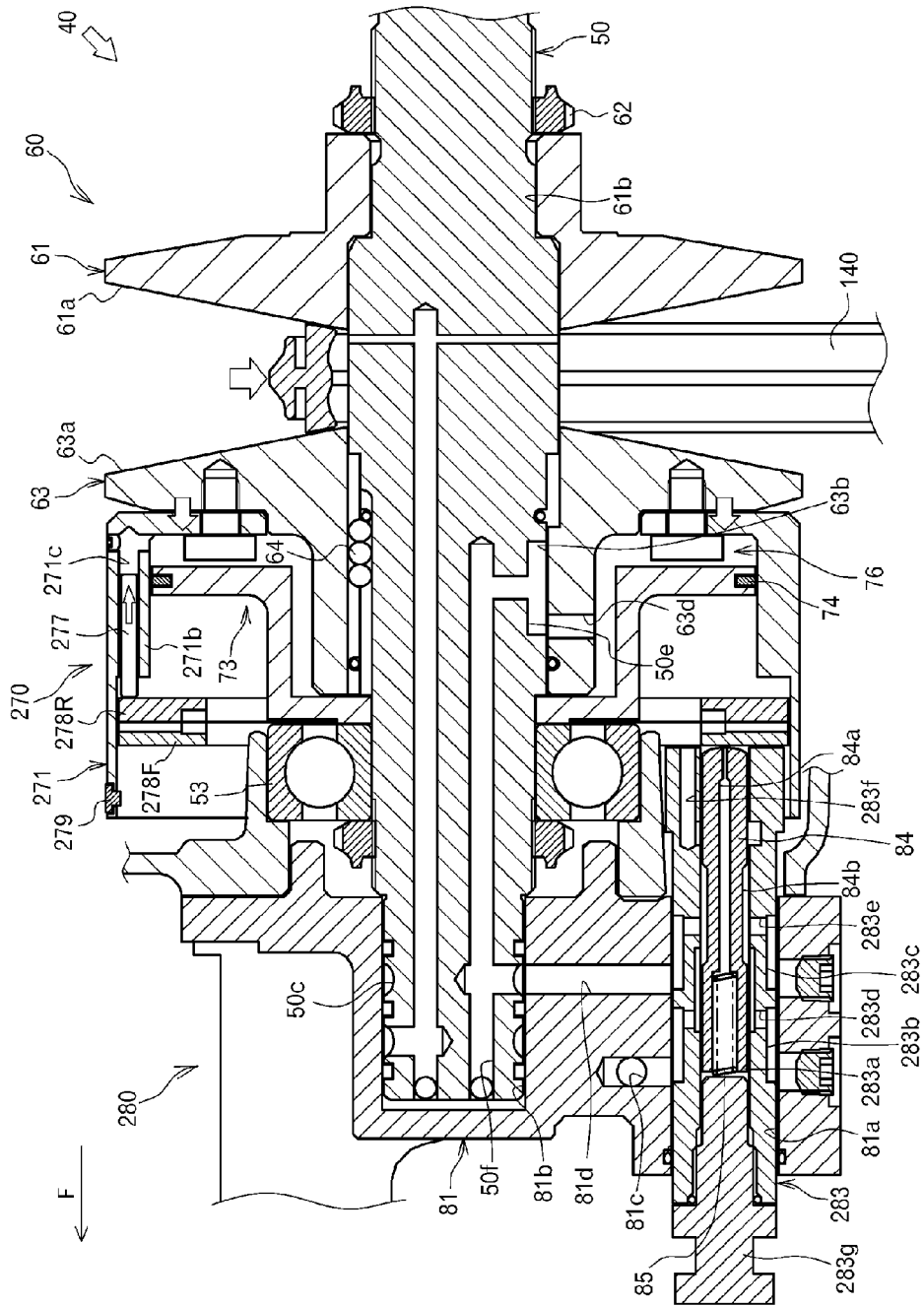
FIG. 15 It is likewise a sideward cross-sectional view showing the case in which the input side movable sheave is slid to the most front.

As shown in FIG. 15, when input side movable sheave 63 further slides forward by the tensile force of the belt 140, the front end of the input side movable sheave 63 comes in contact with the fixed side cylinder casing 73. Thus, the forward sliding of the input side movable sheave 63 is inhibited and thus the input side movable sheave 63 is maintained at this position. Also in this case, since the contact member 278F, the contact member 278R, and the sliding member 277 have slid rearward relative to the movable side cylinder casing 271, the servo spool 283 is maintained at the neutral position.

As described above, when the engine stops, the pressure in the hydraulic chamber 76 drops. Thus, the tensile force of the belt 140 makes the input side movable sheave 63 and the movable side cylinder casing 271 slide forward. However, in the state where the pressure in the hydraulic chamber 76 has dropped, the contact member 278F and the contact member 278R can slide rearward relative to the movable side cylinder casing 271. Thus, the servo spool 283 can be maintained at the neutral position without being pressed toward the front side. Thus, the speed-change controller, not illustrated, coupled to the servo spool 283 is also maintained at the neutral position. Thus, a case where the speed-change controller accidentally moves (against the operator's will) to a position other than the neutral position to give uncomfortable feeling to the operator can be prevented.

When the engine is restarted, conversely to the above described case, the input side movable sheave 63 slides rearward (in the order of FIG. 15, FIG. 14, FIG. 13, and FIG. 2).

Specifically, when the engine is restarted, the hydraulic oil is pumped by the hydraulic oil pump to the hydraulic chamber 76, and thus the pressure in the hydraulic chamber 76 rises. The resultant pressure makes the sliding member 277 slide forward, and thus the contact member 278R and the contact member 278F also slide forward relative to the movable side cylinder casing 271 along with the sliding member 277 (transition from the state in FIG. 15 to the state in FIG. 14). Here, since the servo spool 283 is maintained at the neutral position by the biasing force of the return spring 8b, actually, the movable side cylinder casing 271 slides rearward relative to the contact member 278F. Thus, the input side movable sheave 63 also slides rearward along with the movable side cylinder casing 271.

When the movable side cylinder casing 271 further slides rearward relative to the contact member 278F, and the contact member 278F contacts the inhibiting members 279, the movable side cylinder casing 271 and the contact member 278F become unable to slide with respect to each other. Thus, from this state (state shown in FIG. 13), the contact member 278F, the contact member 278R, the movable side cylinder casing 271 and the input side movable sheave 63 integrally slide rearward to the neutral position shown in FIG. 2. The supplying of the hydraulic oil to the hydraulic chamber 76 is terminated in this state, and thus the input side movable sheave 63 is maintained at this position.

As described above, in the belt-type continuously variable transmission 40 according to this embodiment, the input side movable sheave 63 (movable sheave) is provided with the hydraulic cylinder 270. And the feeding of hydraulic oil to the hydraulic cylinder 270 is controlled by means of the hydraulic servo mechanism 280.

The hydraulic servo mechanism 280 includes:

the servo spool 283 which is biased so as to return to the neutral position and is coupled to the speed-change controller, the servo spool 283 switches an oil passage to the hydraulic cylinder 270 according to the operation of the speed-change controller; and the feedback spool 84 enclosed slidably with respect to the servo spool 283 and arranged so as to slide following the movable side cylinder casing 271 constituting the hydraulic cylinder 270, the feedback spool 84 switches the oil passage in such a manner that the sliding position of the input side movable sheave 63 is retained at the position corresponding to the sliding position of the servo spool 283; and includes:

the contact member 278F, 278R coming into contact with the feedback spool 84 between the hydraulic cylinder 270 and the feedback spool 84; and comprises:

a spool position maintaining mechanism that makes it possible for the contact member 278F, 278R to slide in relation to the movable side cylinder casing 271 when pressure in the hydraulic cylinder 270 is lower than the predetermined value.

With such a configuration, when the pressure in the hydraulic cylinder 270 drops because a driving source (the engine) stops or due to other reasons, the input side movable sheave 63 might be slid by the tensile force of the belt 140, but the servo spool 283 can be prevented from sliding along with the sliding of the input side movable sheave 63. Thus, the speed-change controller coupled to the servo spool 283 can be prevented from moving.

Furthermore, the servo spool 283 is constantly biased to the neutral position. Thus, even when the pressure in the hydraulic cylinder 270 drops as described above, the servo spool 283 can be maintained at the neutral position, and thus the speed-change controller can be maintained at the neutral position.

And, the spool position maintaining mechanism comprises:

the communication holes 271c, 271c, . . . formed in the movable side cylinder casing 271 for communicating the inside and the outside of the hydraulic cylinder 270, the communication hole 271c include a part (lateral hole) whose longitudinal direction is a sliding direction of the movable side cylinder casing 271;

the sliding members 277, 277, . . . inserted slidably into the communication holes 271c, 271c, . . . , wherein an end portion of the sliding member 277 projecting the outside of the hydraulic cylinder 270 is arranged so as to come into contact with a surface of the contact member 278F, 278R opposite to the surface abutting on the feedback spool 84; and the inhibiting members 279, 279, . . . for regulating the sliding of the contact member 278F, 278R toward the feedback spool 84 side at a predetermined position.

In this embodiment, the contact member 278F and the contact member 278R are used as the contact member according to the present invention. The oil groove 278a and the oil groove 278b are respectively formed on the rear surface of the contact member 278F and the front surface of the contact member 278R. With such a configuration, oil passages (the oil groove 278a and the oil groove 278b) for lubricating the sliding surfaces of the contact member 278F and the contact member 278R can be easily formed.

In this embodiment, a combination of two members (the contact member 278F and the contact member 278R) is used as the contact member according to the present invention. However, the present invention is not limited to this, and a single member or a combination of three or more members may be used as the contact member. The sliding member 277 is described to have an approximately column shape. However, the present invention is not limited to this. Any shape can be employed as long as the sliding member 277 can slide forward and rearward in the communication hole 271c of the movable side cylinder casing 271 while closing the communication hole 271c. The inhibiting member 279 fits the through hole 271d of the movable side cylinder casing 271 from the outer side. However, the present invention is not limited to this. Any member can be used as long as it can inhibit the sliding of the contact member 278F and the contact member 278R (for example, a retaining ring fixed on the inner periphery surface of the movable side cylinder casing 271).

Figure 16:
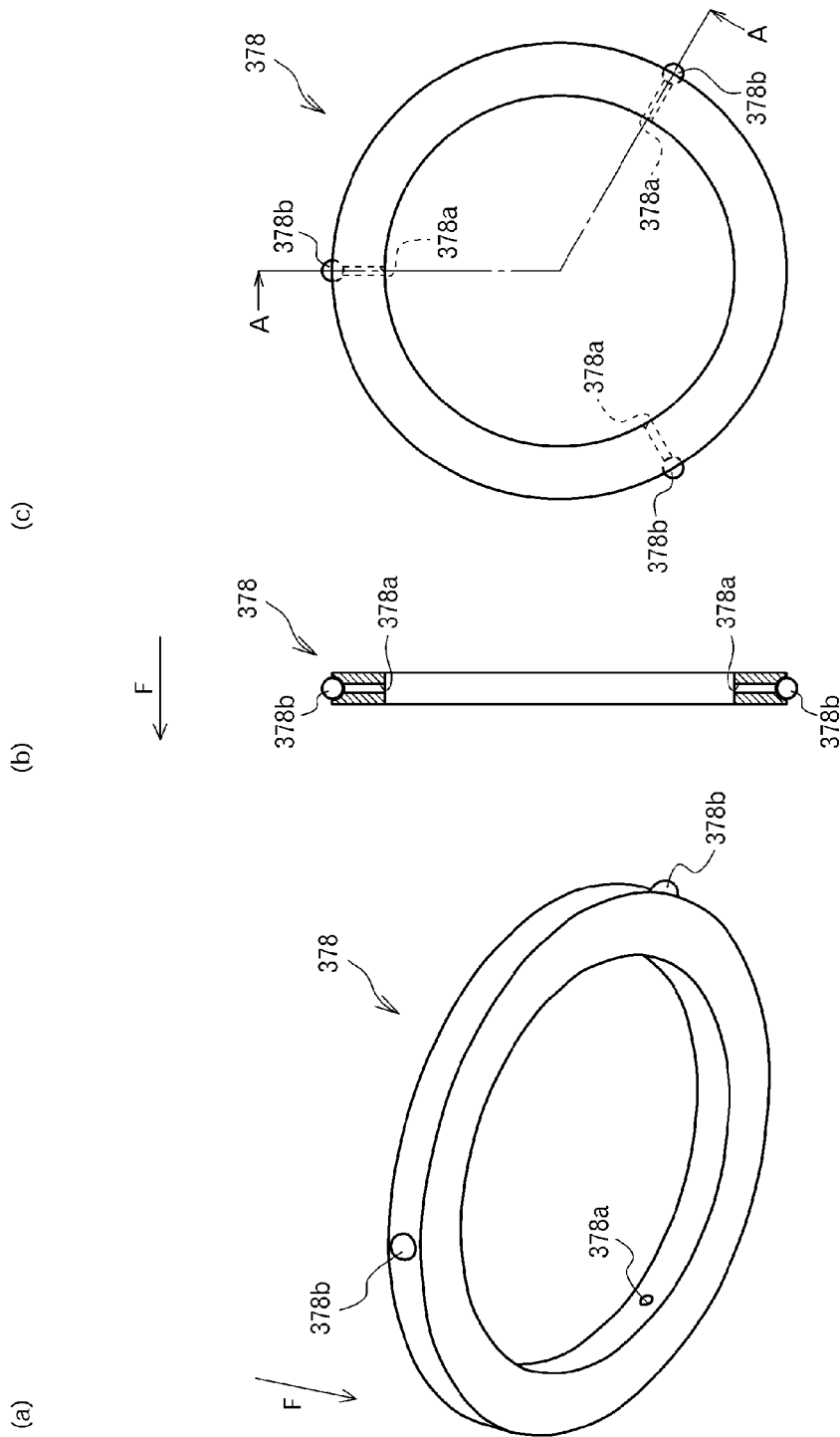
FIG. 16 (a) It is a perspective view showing a contact member according to another embodiment. (b) It is likewise an A-A cross-sectional view of the contact member. (c) It is likewise a front view of the contact member.

A contact member 378 shown in FIG. 16 may be used as the contact member according to the present invention instead of the contact member 278F and the contact member 278R.

The contact member 378 shown in FIG. 16 is formed to have a shape in which a hole is formed in the center of a disc shaped member (annular shape). The outer diameter of the contact member 378 is set to be approximately the same as the inner diameter of the cylinder portion of the movable side cylinder casing 271 (specifically, slightly smaller than the inner diameter of the cylinder portion of the movable side cylinder casing 271 to secure slidability) (see FIG. 2 etc.). In the contact member 378, three oil holes 378a, 378a, . . . are formed to communicate between the inner periphery surface and the outer periphery surface of the contact member 378. The oil holes 378a, 378a, . . . are separated from each other at an equal interval. A semispherical recess is formed on the outer side end portion of each oil hole 378a. A steel ball 378b is disposed in the recess. Outer side end portions of the steel balls 378b, 378b, . . . protrude outward from the outer periphery surface of the contact member 378.

When such a contact member 378 is used, grooves extending in the axial direction of the movable side cylinder casing 271 are formed in the inner periphery surface of the cylinder portion of the movable side cylinder casing 271 at positions corresponding to the steel balls 378b, 378b, . . . of the contact member 378. With the steel balls 378b, 378b, . . . of the contact member 378 fit in the grooves, the contact member 378 can be prevented from inclining with respect to the movable side cylinder casing 271 when the contact member 378 slides relative to the movable side cylinder casing 271. Thus, damage on the components due to the misalignment between the contact member 378 and the movable side cylinder casing 271 can be prevented.

A belt-type continuously variable transmission 40 according to a second embodiment will be described below.

In the conventional belt-type continuously variable transmission, when the feedback spool excessively slides relative to the servo spool due to an operation on the speed-change controller and the like, an oil passage leading to the hydraulic cylinder might be closed against an operator's will. Thus, the hydraulic cylinder might operate against the operator's will, and thus there is a disadvantage that the operability and the operation feeling might be degraded.

Thus, the present invention provides a belt-type continuously variable transmission that can prevent the feedback spool from excessively sliding relative to the servo spool to close the oil passage leading to the hydraulic cylinder.

The belt-type continuously variable transmission 40 according to the second embodiment is mainly different from the belt-type continuously variable transmission 40 according the first embodiment in that the hydraulic servo mechanism 280 includes an interlocking member 286. Thus, the difference from the configuration of the belt-type continuously variable transmission 40 according to the first embodiment will be described below and the description on the similar configuration will be omitted.

Figure 17:
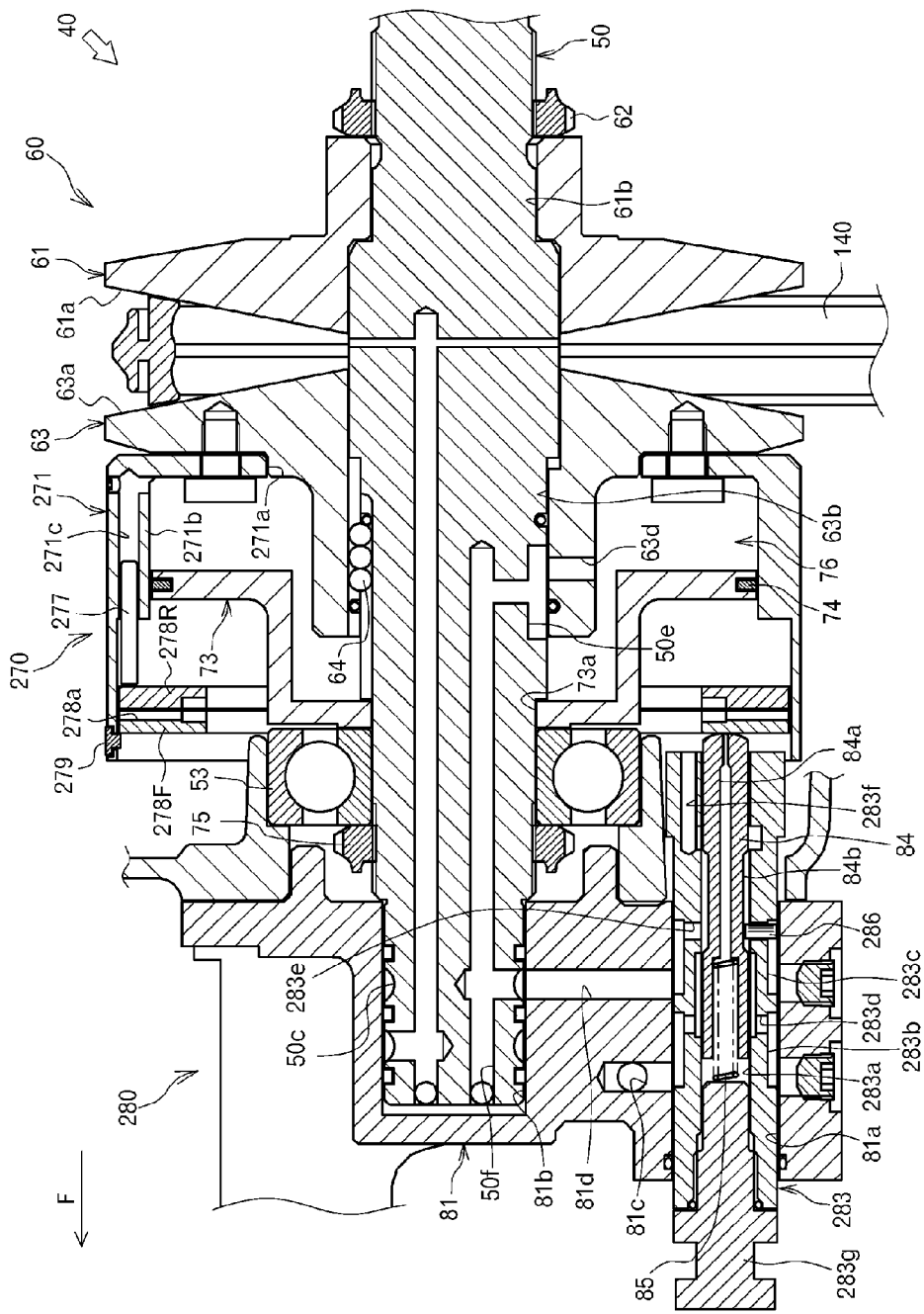
FIG. 17 It is a sideward cross-sectional view showing an input pulley, a hydraulic cylinder, a hydraulic servo mechanism, etc. of a belt-type continuously variable transmission according to a second embodiment.
Figure 18:
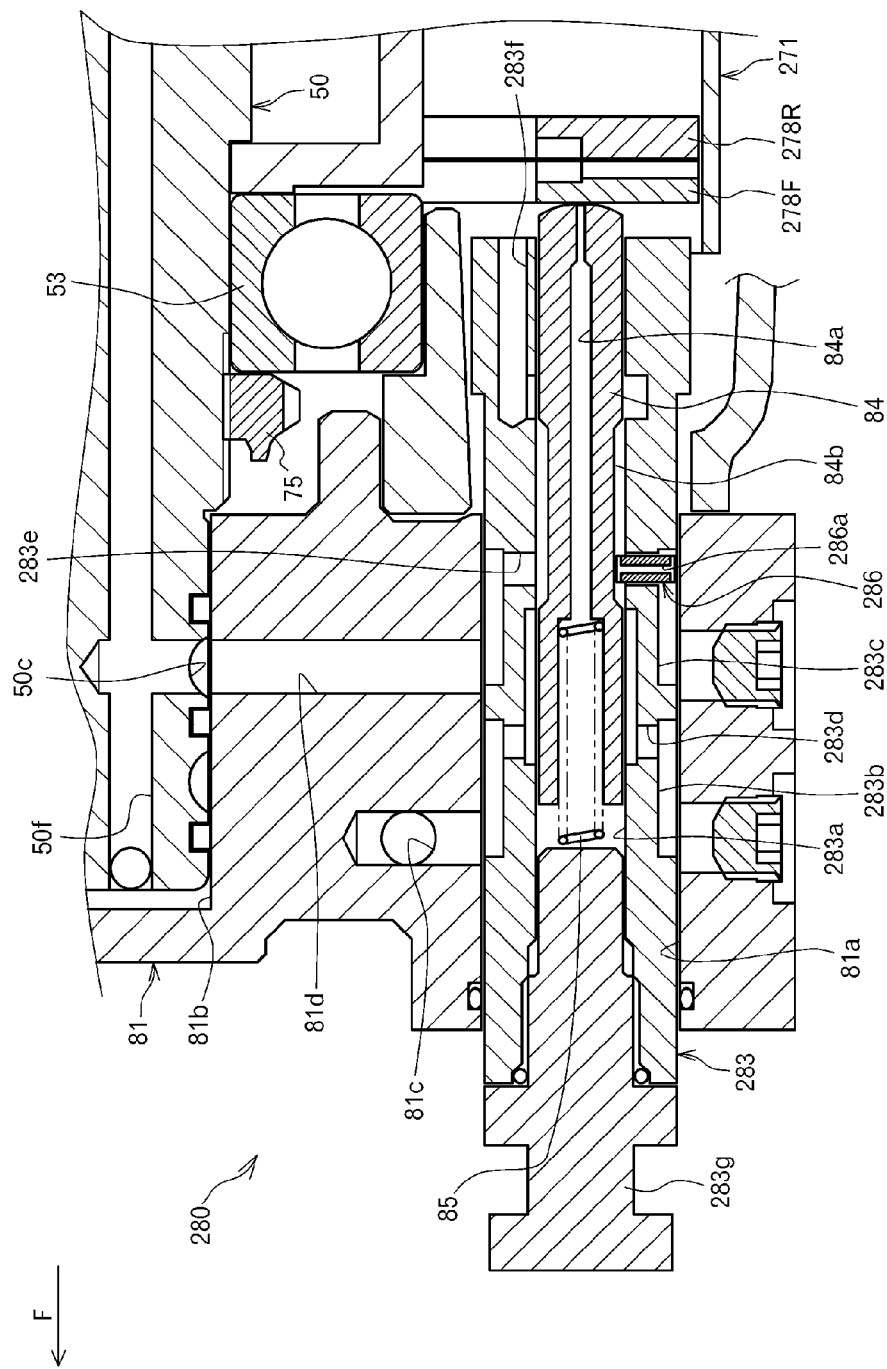
FIG. 18 It is an enlarged sideward cross-sectional view showing a servo spool and a feedback spool.

The hydraulic servo mechanism 280 shown in FIG. 17 and FIG. 18 controls the transmission of the hydraulic oil to the hydraulic cylinder 270, and further controls the operation of the input side movable sheave 63 through the hydraulic cylinder 270. The hydraulic servo mechanism 280 includes the front casing 81, the servo spool 283, the feedback spool 84, the spool spring 85, the interlocking member 286, etc.

Figure 19:
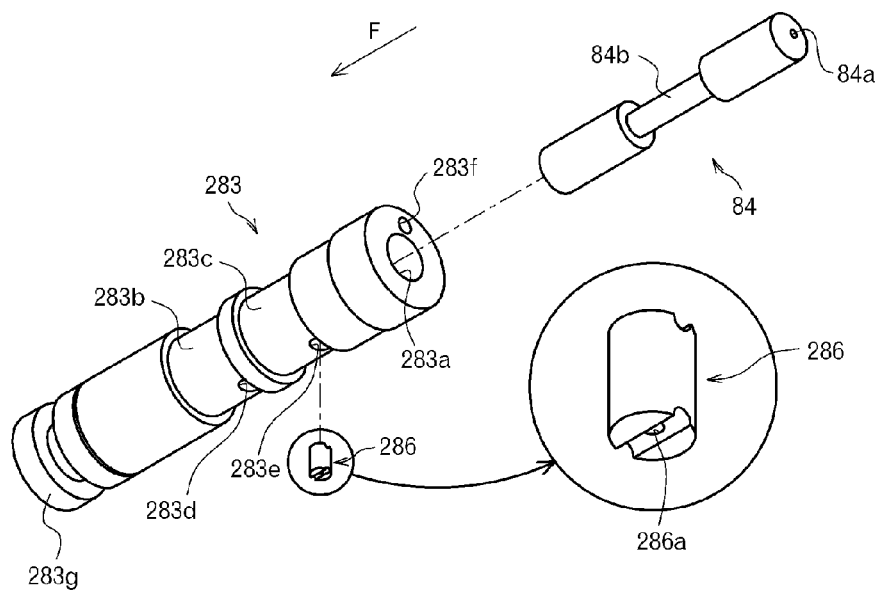
FIG. 19 (a) It is a perspective view showing the servo spool, the feedback spool, and an interlocking member. (b) It is likewise a sideward cross-sectional view showing the servo spool, the feedback spool, and the interlocking member.
Figure 19:
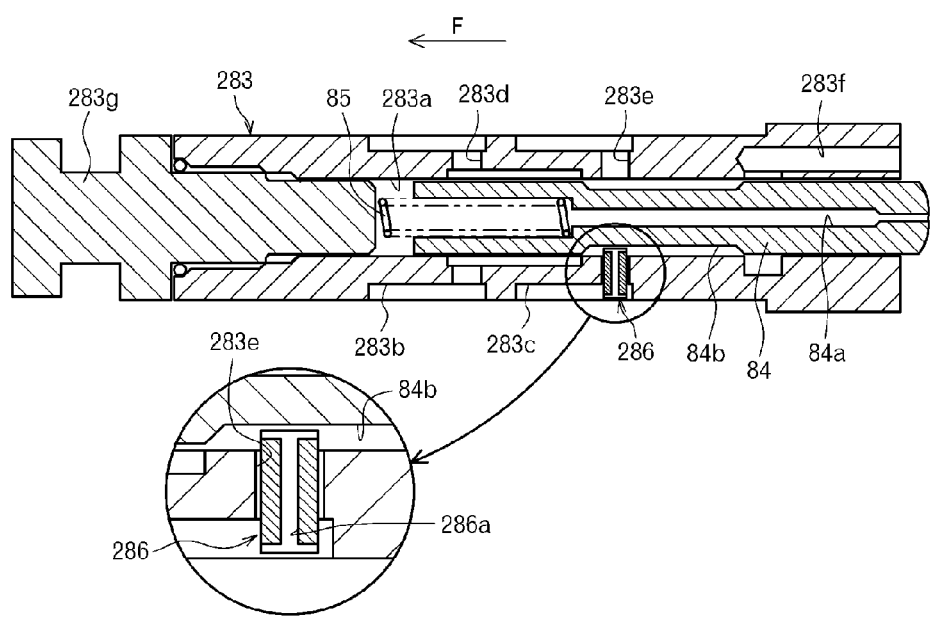

The servo spool 283 shown in FIG. 17, FIG. 18, and FIG. 19 switches an oil passage in the hydraulic servo mechanism 280. The sliding hole 283a, the first groove 283b, the second groove 283c, the first through hole 283d, the second through hole 283e, the exhaust oil passage 283f, etc. are formed in the servo spool 283.

The second through hole 283e has an axial direction in a direction orthogonal to the axis of the servo spool 283 and is formed to communicate between the second groove 283c and the sliding hole 283a. The second through hole 283e has a circular cross sectional shape.

The feedback spool 84 shown in FIG. 17, FIG. 18, and FIG. 19 switches oil passage in the hydraulic servo mechanism 280. The discharge oil passage 84a, the communication groove 84b, etc. are formed in the feedback spool 84.

The discharge oil passage 84a is an oil passage formed to communicate between the front and rear ends of the feedback spool 84 on the axis of the feedback spool 84. The communication groove 84b is formed along the outer periphery surface of the feedback spool 84 at an approximately center portion of the feedback spool 84 in the axial direction. More specifically, a portion where the communication groove 84b is formed has a smaller outer diameter than the other portion.

The outer diameter of the feedback spool 84 (more specifically, the outer diameter of the portion where the communication groove 84b is not formed) is set to be approximately the same with the inner diameter of the sliding hole 283a of the servo spool 283. The feedback spool 84 is slidably inserted in the sliding hole 283a of the servo spool 283. Thus, the feedback spool 84 is slidable in a front-rear direction relative to the servo spool 283.

With the feedback spool 84 being constantly biased toward the rear side by the spool spring 85, the rear end of the feedback spool 84 is constantly in contact with the front surface of the contact member 278F inserted in the movable side cylinder casing 271. Thus, the feedback spool 84 indirectly contacts the movable side cylinder casing 271 with the contact member 278F provided in between.

The interlocking member 286 inhibits the sliding of the feedback spool 84 toward rear side relative to the servo spool 283 at a predetermined position. The interlocking member 286 has an approximately column shape and has an outer diameter set to be approximately the same as the inner diameter of the second through hole 283e of the servo spool 283. An oil groove 286a that communicates between one end surface and the other end surface of the interlocking member 286 is formed in the interlocking member 286.

The interlocking member 286 is inserted in the second through hole 283e of the servo spool 283 after the feedback spool 84 is inserted in the sliding hole 283a of the servo spool 283. Here, one end (upper end in FIG. 19) of the interlocking member 286 protrudes into the sliding hole 283a of the servo spool 283. Thus, the one end of the interlocking member 286 is positioned in the communication groove 84b of the feedback spool 84. Thus, the interlocking member 286 is disposed over the second through hole 283e of the servo spool 283 and the communication groove 84b of the feedback spool 84.

Figure 20:
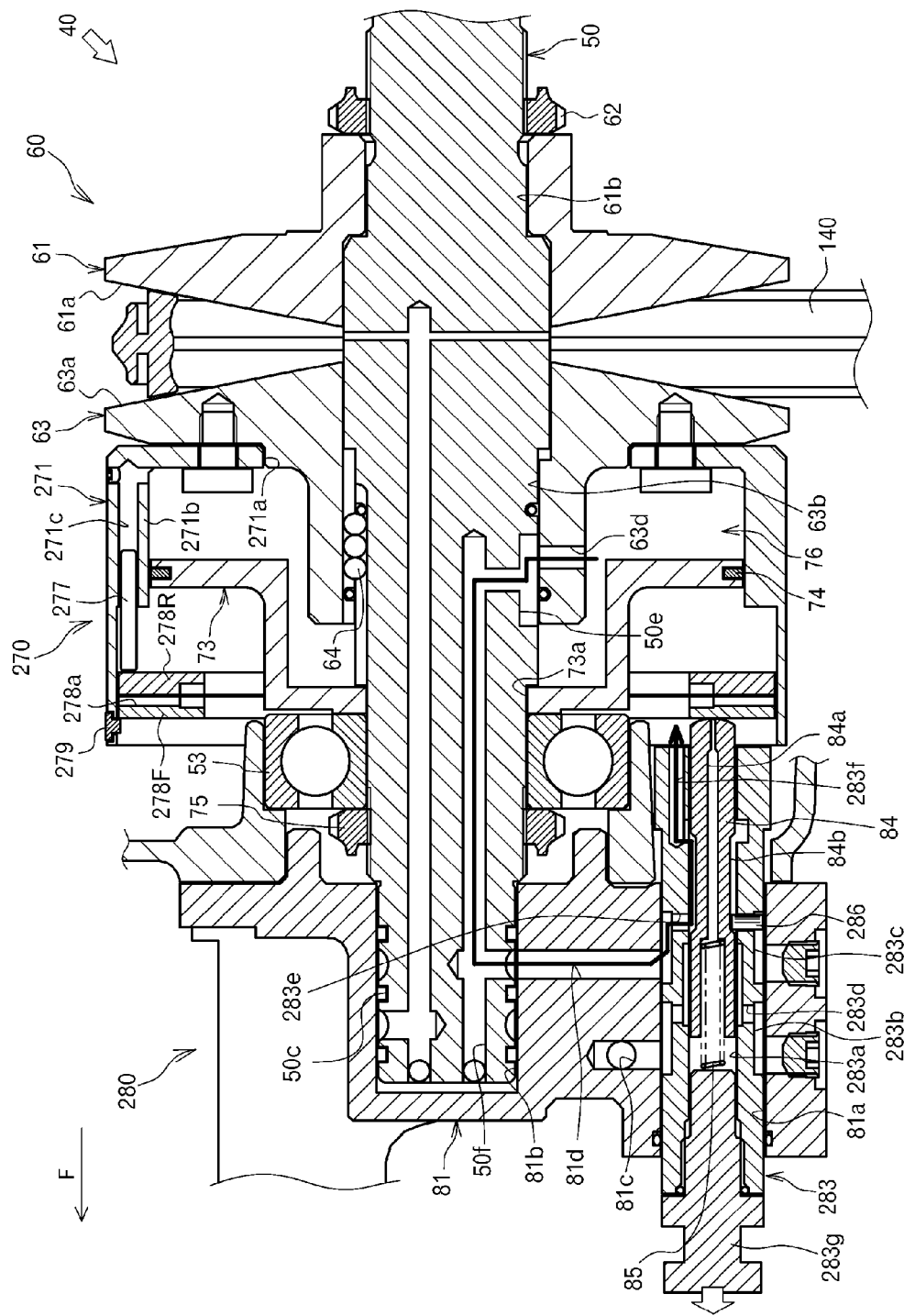
FIG. 20 It is a sideward cross-sectional view showing the case in which the servo spool is slid forward.

As shown in FIG. 20, the state of the servo spool 283 and the feedback spool 84 in a case the servo spool 283 slides forward by an operation on the speed-change controller will be described below.

Figure 21:
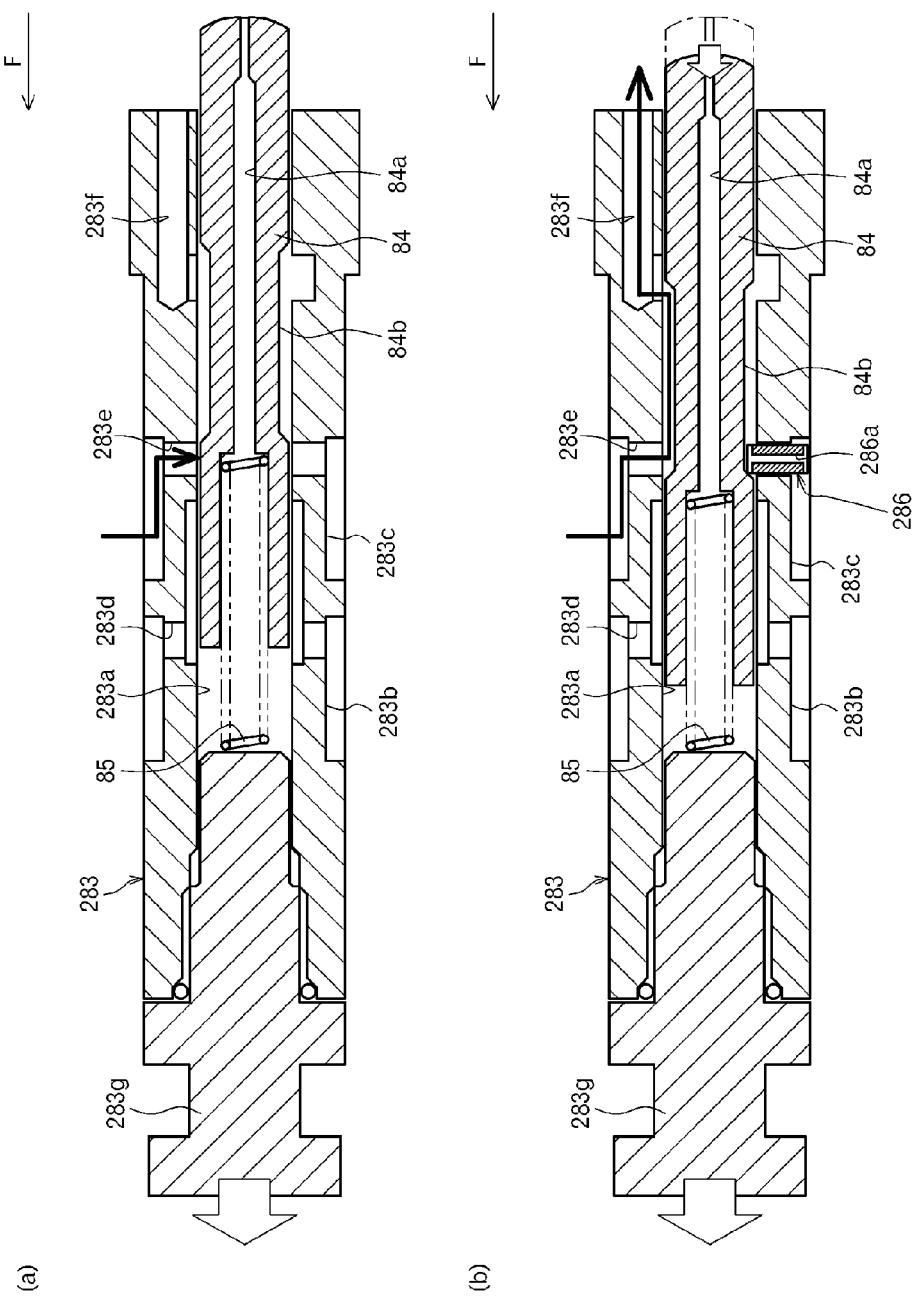
FIG. 21 (a) It is a sideward cross-sectional view showing the state of flow of operating fluid when the servo spool is slid forward and the interlocking member is not present. (b) It is likewise a sideward cross-sectional view showing the state of flow of operating fluid when the servo spool is slid forward and the interlocking member is present.

First, for comparison, a case where, unlike in the present embodiment, the interlocking member 286 is not disposed in the second through hole 283e of the servo spool 283 will be considered as shown in FIG. 21(a). Here, when the servo spool 283 slides forward, the feedback spool 84 might excessively slide rearward relative to the servo spool 283, and thus the second through hole 283e might be closed by the outer periphery surface of the feedback spool 84. Here, the case where the feedback spool 84 excessively slides rearward relative to the servo spool 283 is assumed to be caused by a sudden operation on the servo spool 283 for example (that is, a sudden operation on the speed-change controller), or the like.

Here, discharging of the hydraulic oil in the hydraulic chamber 76 as shown in FIG. 20 cannot be performed. Specifically, the hydraulic cylinder 270 does not operate as the operator of the speed-change controller desired, thereby degrading the operability and the operation feeling. Furthermore, here, the first through hole 283d of the servo spool 283 communicates with the sliding hole 283a (more specifically, a space in the sliding hole 283a more on the front side than the feedback spool 84). Thus, the hydraulic oil is pumped into the space from the hydraulic pump, whereby the pressure in the space rises. The feedback spool 84 receives the pressure from the front side. Thus, it becomes difficult for the feedback spool 84 to slide forward, thereby further degrading the operability and the operation feeling.

Now, a case where the interlocking member 286 is disposed in the second through hole 283e of the servo spool 283 as in this embodiment (see FIG. 21(b)) will be described. Here, when the servo spool 283 slides forward, at a position (predetermined position) of the feedback spool 84 that has slid rearward relative to the servo spool 283 for a predetermined distance, one end (upper end) of the interlocking member 286 engage with the front end portion of the communication groove 84b of the feedback spool 84. Thus, the feedback spool 84 cannot slide rearward relative to the servo spool 283 any further. Specifically, when the servo spool 283 slides forward in this state, the feedback spool 84 integrally slides forward with the servo spool 283.

Here, the communication groove 84b of the feedback spool 84 faces the second through hole 283e and the exhaust oil passage 283f of the servo spool 283, and thus the hydraulic oil can flow into the exhaust oil passage 283f through the second groove 283c and the second through hole 283e. Thus, discharging of the hydraulic oil in the hydraulic chamber 76 as shown in FIG. 20 can be performed as the operator of the speed-change controller desired.

Moreover, here, the hydraulic oil flowing in the second through hole 283e can also flow into the oil groove 286a formed in the interlocking member 286. Thus, a large area can be secured for the oil passage through which the hydraulic oil flows into the exhaust oil passage 283f.

As described above, in the belt-type continuously variable transmission 40 according to this embodiment, the input side movable sheave 63 (movable sheave) is provided with the hydraulic cylinder 270. And the feeding of hydraulic oil to the hydraulic cylinder 270 is controlled by means of the hydraulic servo mechanism 280.

The hydraulic servo mechanism 280 includes:
the servo spool 283 coupled to the speed-change controller, the servo spool 283 switches the oil passage to the hydraulic cylinder 270 by sliding corresponding to the operation of the speed-change controller;
the feedback spool 84 enclosed slidably with respect to the servo spool 283, the feedback spool 84 biased in a direction (toward the rear side) to be contact with the movable side cylinder casing 271 constituting the hydraulic cylinder 270, the feedback spool 84 configured to switch the oil passage to maintain a slid position of the input side movable sheave 63 at a position corresponding to a slid position of the servo spool 283; and
the interlocking member 286 for regulating sliding of the feedback spool 84 in a direction to abut on the movable side cylinder casing 271 at a predetermined position.

With such a configuration, the feedback spool 84 can be prevented from sliding excessively relative to the servo spool 283 to close the oil passage to the hydraulic cylinder 270. Thus, the operability and the operation feeling can be improved.

Moreover, the oil groove 286a forming the oil passage to the hydraulic cylinder 270 is formed in the interlocking member 286.

With such a configuration, a large area can be secured for the oil passage to the hydraulic cylinder 270.

In this embodiment, the improvement of the operability and the operation feeling as described above can be achieved with the simple configuration of inserting the interlocking member 286 in the second through hole 283e.

As a method for preventing the second through hole 283e described above from being closed (see FIG. 21(a)), a method of setting the total length (front-rear direction length) of the communication groove 84b to be long so that a large portion at which the second through hole 283e and the communication groove 84b face each other can be secured can also be employed. However, in such a method, the servo spool 283 and the feedback spool 84 also need to have a long entire length, and thus there is a disadvantage that the components become larger. On the other hand, in the hydraulic servo mechanism 280 according to this embodiment, the entire length of the servo spool 283 and the feedback spool 84 need not to be longer, and thus the components do not become larger.

In this embodiment, the interlocking member 286 has the approximately column shape. However, the present invention is not limited to this. Any shape (e.g., rectangular column shape, a plate shape, etc.) can be employed as long as the sliding of the feedback spool 84 rearward can be inhibited at a predetermined position. The shape of the oil groove 286a formed in the interlocking member 286 is not limited to that in this embodiment. Any shape can be employed as long as the hydraulic oil can flow between one end and the other end of the interlocking member 286.

INDUSTRIAL APPLICABILITY

The present invention is applicable to a technique of a belt-type continuously variable transmission, more specifically to a technique of a hydraulic servo mechanism that changes a transmission ratio in the belt-type continuously variable transmission.

DESCRIPTION OF NOTATIONS 40 belt-type continuously variable transmission
63 input side movable sheave (movable sheave)
270 hydraulic cylinder
271 movable side cylinder casing
271c communication hole
277 sliding member
278F contact member
278R contact member
279 inhibiting member
280 hydraulic servo mechanism
283 servo spool
286 interlocking member
286a oil groove
84 feedback spool

What is claimed is:
1. A belt-type continuously variable transmission in which a movable sheave is provided with a hydraulic cylinder, which controls the feeding of hydraulic oil to the hydraulic cylinder by means of a hydraulic servo mechanism, wherein
the hydraulic servo mechanism comprises:
a servo spool which is biased so as to return to a neutral position and is coupled to a speed-change controller, the servo spool switches an oil passage to the hydraulic cylinder according to the operation of the speed-change controller; and
a feedback spool enclosed slidably with respect to the servo spool and arranged so as to slide following a movable side cylinder casing constituting the hydraulic cylinder, the feedback spool switches the oil passage in such a manner that the sliding position of the movable sheave is retained at a position corresponding to the sliding position of the servo spool; and includes:
a contact member coming into contact with the feedback spool between the hydraulic cylinder and the feedback spool; and comprises:
a spool position maintaining mechanism that makes it possible for the contact member to slide in relation to the movable side cylinder casing when pressure in the hydraulic cylinder is lower than a predetermined value.

2. The belt-type continuously variable transmission according to claim 1 wherein,
the spool position maintaining mechanism comprises:
a communication hole formed in the movable side cylinder casing for communicating the inside and the outside of the hydraulic cylinder, the communication hole includes a part whose longitudinal direction is a sliding direction of the movable side cylinder casing;
a sliding member inserted slidably into the communication hole, wherein an end portion of the sliding member projecting the outside of the hydraulic cylinder is arranged so as to come into contact with a surface of the contact member opposite to the surface abutting on the feedback spool; and
a inhibiting member for regulating the sliding of the contact member toward the feedback spool side at a predetermined position.

3. The belt-type continuously variable transmission according to claim 2 further comprising an interlocking member for regulating sliding of the feedback spool in a direction to abut on the one of the movable sheave at a predetermined position.

4. The belt-type continuously variable transmission according to claim 3 wherein, an oil groove constituting an oil passage to the hydraulic cylinder is formed in the interlocking member.

* * * * *